USOO9182576B2

(12) United States Patent
Iba et al.

(10) Patent No.: US 9,182,576 B2
(45) Date of Patent: Nov. 10, 2015

(54) IMAGE PICKUP LENS, IMAGE PICKUP DEVICE USING SAME, AND PORTABLE APPARATUS EQUIPPED WITH THE IMAGE PICKUP DEVICE

(75) Inventors: Takumi Iba, Kyoto (JP); Takashi Kitamura, Osaka (JP); Masatoshi Yamashita, Osaka (JP); Hirohiko Ina, Hyogo (JP)

(73) Assignee: Panasonic Intellectual Property Management Co. Ltd., Osaka (JP)

( * ) Notice: Subject to any disclaimer, the term of this patent is extended or adjusted under 35 U.S.C. 154(b) by 686 days.

(21) Appl. No.: 13/577,588

(22) PCT Filed: Feb. 1, 2011

(86) PCT No.: PCT/JP2011/000544
§ 371 (c)(1),
(2), (4) Date: Aug. 7, 2012

(87) PCT Pub. No.: WO2011/096193
PCT Pub. Date: Aug. 11, 2011

(65) Prior Publication Data
US 2012/0307135 A1  Dec. 6, 2012

(30) Foreign Application Priority Data
Feb. 8, 2010 (JP) ................. 2010-025641

(51) Int. Cl.
*G02B 13/18* (2006.01)
*G02B 13/00* (2006.01)
*G02B 3/08* (2006.01)
(52) U.S. Cl.
CPC .............. *G02B 13/18* (2013.01); *G02B 13/004* (2013.01); *G02B 3/08* (2013.01)
(58) Field of Classification Search
CPC ................. G02B 13/004; H04N 9/73

USPC ............... 359/573, 724, 773; 348/360
See application file for complete search history.

(56) References Cited

U.S. PATENT DOCUMENTS

| 6,010,647 A | 1/2000 | Nomura et al. |
| 2003/0142877 A1 | 7/2003 | George et al. |

(Continued)

FOREIGN PATENT DOCUMENTS

| JP | 11-023809 | 1/1999 |
| JP | 2003-270526 | 9/2003 |
| JP | 2005-513833 | 5/2005 |
| JP | 2007-122055 | 5/2007 |

(Continued)

*Primary Examiner* — Zachary Wilkes
*Assistant Examiner* — William R Alexander
(74) *Attorney, Agent, or Firm* — Hamre, Schumann, Mueller & Larson, P.C.

(57) ABSTRACT

The present invention provides an image pickup lens with a large focal depth from the center to the outer part of an image plane formed on an image sensor and capable of maintaining its focal depth within a practical range and thus suppressing a decline in the resolution. An image pickup lens 7 includes, in order from the object side to the image plane side, an aperture stop 5, a first lens 1 that is a biconvex lens having positive power, a second lens 2 that is a meniscus lens having negative power and whose lens surface facing the object side is convex, a third lens 3 that is a meniscus lens having positive power and whose lens surface facing the object side is concave, and a fourth lens 4 that is a biconcave lens having negative power. The image pickup lens 7 includes a multifocal lens on the lens surface of the first lens 1 facing the object side. D and Ymax satisfy the following conditional expression (1):

$$0 \leq D/Ymax \leq 0.1 \tag{1}$$

where D is an absolute value of the distance between the multifocal lens surface and a surface of the aperture stop on the optical axis, and Ymax is the absolute value of the maximum image height on an image plane formed on the image sensor.

9 Claims, 21 Drawing Sheets

(56) References Cited

U.S. PATENT DOCUMENTS

2007/0097253 A1* 5/2007 Woo et al. .................. 348/345
2010/0079658 A1* 4/2010 Ohara et al. ................ 348/340

FOREIGN PATENT DOCUMENTS

| | | |
|---|---|---|
| JP | 2008-058540 | 3/2008 |
| JP | 2008-233222 | 10/2008 |

* cited by examiner (a)  (b)

IMAGE PICKUP LENS, IMAGE PICKUP DEVICE USING SAME, AND PORTABLE APPARATUS EQUIPPED WITH THE IMAGE PICKUP DEVICE

TECHNICAL FIELD

The present invention relates to an image pickup lens suitable for small portable apparatuses equipped with an image pickup device, such as PC cameras, security cameras, compact cameras, and mobile phones. The present invention also relates to an image pickup device using the image pickup lens and to a portable apparatus equipped with the image pickup device.

BACKGROUND ART

In recent years, small portable apparatuses equipped with an image pickup device (camera module), such as mobile phones, have become widely popular, and taking pictures instantly with such small portable apparatuses has become a common practice. And for small image pickup devices incorporated in such small portable apparatuses, an image pickup lens that requires no driving of the lens for focusing is proposed in order to avoid an increase in the size (see Patent Document 1, for example).

In the image pickup lens described in Patent Document 1, an inner area and an outer area of at least one lens surface concentric with the optical axis have different curvatures, and when f1 is the focal distance of the entire system resulting from the curvature of the outer area and f2 is the focal distance of the entire system resulting from the curvature of the inner area, f1 and f2 satisfies the following conditional expression (6).

$$0.3 \leq f2/f1 \leq 0.9 \tag{6}$$

And according to the configuration of the image pickup lens described in Patent Document 1, object points that are significantly different from each other in their object point distance can be imaged on the same image plane at the same time (i.e., object points that are significantly different from each other in their object point distance can be imaged at the same time without driving the lens for focusing).

PRIOR ART DOCUMENT

Patent Document

Patent Document 1: JP 2003-270526 A

SUMMARY OF INVENTION

Problem to be Solved by the Invention

However, although being compact, an image pickup device using the image pickup lens described in Patent Document 1 is a bifocal lens system with a large focal depth, so that its focal depth differs between the center and the outer part of an image plane formed on an image sensor. This leads to deterioration in the resolution.

With the foregoing in mind, it is an object of the present invention to provide an image pickup lens with a large focal depth from the center to the outer part of an image plane formed on an image sensor, and capable of maintaining its focal depth within a practical range and thus suppressing a decline in the resolution. Also, it is an object of the present invention to provide an image pickup device using the image pickup lens, and a portable apparatus equipped with the image pickup device.

Means for Solving Problem

In order to achieve the above object, the image pickup lens of the present invention is an image pickup lens for use in an image pickup device for restoring an image detected by an image sensor. The image pickup lens includes at least one lens, and the image pickup lens includes, on at least one lens surface of the at least one lens, a multifocal lens surface having a plurality of surface areas having different focal points. An aperture stop is placed adjacent to the multifocal lens surface, and when D is an absolute value of a distance between the multifocal lens surface and a surface of the aperture stop on the optical axis, and Ymax is an absolute value of a maximum image height on an image plane formed on the image sensor, D and Ymax satisfy the following conditional expression (1).

$$0 \leq D/Y\text{max} \leq 0.1 \tag{1}$$

If at least one of a plurality of lens surfaces of an optical system includes a plurality of areas defined by different functions, the focal properties of the optical system vary from one light ray to another incident on the different areas. As a result, images obtained from this optical system are obtained due to the combination of the focal properties that vary from one incident area to another. In the present invention, this is considered as being "multifocal."

For example, for an optical system including a lens surface having a plurality of areas defined by different curvatures, a paraxial focal position varies depending on which area of the lens surface light rays enter. This means that the focal properties vary from one area to another, so that this optical system can be considered as being multifocal.

Further, for an optical system including a lens surface having a plurality of areas defined by different aspherical coefficients and/or conic constants, if these areas have the same curvature but have different aspherical coefficients and/or conic constants, characteristics of aberrations that occur vary depending on which area of the lens surface light rays enter. This also means that the focal properties vary from one area to another, so that this optical system can be considered as being multifocal.

According to the configuration of the image pickup lens of the present invention, it is possible to provide an image pickup lens having aberration characteristics that facilitate the restoration of images detected by an image sensor at high resolution and with a large focal depth from the center to the outer part of an image plane formed on an image sensor. That is, according to the configuration of the image pickup lens of the present invention, it is possible to provide an image pickup lens with a large focal depth from the center to the outer part of an image plane formed on an image sensor, and capable of maintaining its focal depth within a practical range and thus suppressing a decline in the resolution.

Further, in the configuration of the image pickup lens of the present invention, when f1 and f2 are focal distances of any two of the areas of the multifocal lens surface, it is preferable that f1 and f2 satisfy the following conditional expression (2).

$$0.95 \leq f1/f2 \leq 1.05 \tag{2}$$

According to this preferred example, if the difference in focal distance between any two of the areas of the multifocal lens surface is within ±5%, an image plane formed on the image sensor is likely to have uniform resolution performance at a continuous range of subject distances (the distance from the lens to the subject) from far to near subject distances. On the other hand, if f1 and f2 do not satisfy the conditional expression (2), the resolution is less likely to be adequate at a subject distance intermediate between far and near subject distances.

It should be noted that as long as at least one of any two of the areas of the multifocal lens surface is aspherical and the any two of the areas have different aspherical coefficients and/or conic constants, an image plane formed on the image sensor is likely to have uniform resolution performance at a continuous range of subject distances from far to near subject distances even if the any two of the areas have the same focal distance (f1/f2=1.00).

Further, in the configuration of the image pickup lens of the present invention, it is preferable that the boundary of the areas is concentric with the optical axis. According to this preferred example, the multifocal lens surface becomes rotationally symmetrical to the optical axis. This makes it easy to produce the lens and a mold for the lens.

Further, in the configuration of the image pickup lens of the present invention, it is preferable that the image pickup lens includes a diffractive optical element surface on at least one lens surface of the at least one lens.

When the level of longitudinal chromatic aberration increases, image characteristics of a fixed image plane at each wavelength vary depending on the object distance. However, since an image restoration system cannot acquire object distance information, it becomes difficult to achieve favorably restored images at various object distances. For this reason, it is necessary to reduce the level of longitudinal chromatic aberration as much as possible. Further, when a chromatic aberration of magnification increases, the resolution of an image plane perpendicular to the optical axis declines. Generally, the chromatic aberration of magnification varies depending on the image height (the aberration is 0 at the center). If image characteristics vary depending on the image height, it becomes difficult to achieve favorably restored images. For this reason, it is necessary to reduce the chromatic aberration of magnification as much as possible without depending on the image height. As in the above preferred example, if the image pickup lens includes a diffractive optical element surface on at least one lens surface of the at least one lens, chromatic aberration can be corrected favorably through the diffractive optical element surface. As a result, it is possible to provide an image pickup lens with a large focal depth that is more suitable for an image restoration system. Further, if a standard lens without a multifocal lens surface is provided with a diffractive optical element surface, light rays with unnecessary diffraction orders may cause flare. The term "light rays with unnecessary diffraction orders" as used herein refers to light rays with diffraction orders other than design diffraction orders, and these light rays form images around images formed by light rays with design diffraction orders and these images serve as flare components. However, since the image pickup lens of the present invention includes a multifocal lens surface, the image pickup lens has image-forming performance that results in large aberration. Thus, the expanse of an image formed by the image pickup lens and flare images formed by light rays with unnecessary diffraction orders overlap one another, so that flare becomes less noticeable. Also from such a viewpoint, in the configuration of the image pickup lens of the present invention, it is preferable that the image pickup lens includes a diffractive optical element surface on at least one lens surface of the at least one lens.

Further, in the configuration of the image pickup lens of the present invention, it is preferable that MTF (Modulation Transfer Function) through-focus characteristics obtained from the image pickup lens at the image plane describe a curve that has an MTF peak when the image plane is positioned on a positive side of an optical axis direction and declines as the image plane is defocused towards a negative side of the optical axis direction.

The term "MTF through-focus characteristics" as used herein refers to MTF characteristics that are defined by the horizontal axis and the vertical axis: the horizontal axis represents the direction of the optical axis where, in an image field of an image pickup lens, the direction from an object field to the image field is a positive direction; and the vertical axis represents MTF at an image plane perpendicular to the optical axis. The MTF through-focus characteristics are used in evaluating the focal depth on a given object.

According to this preferred example, it is possible to allow the resolution on the far point side to have an edge over that on the near point side as needed.

Further, in the configuration of the image pickup lens of the present invention, it is preferable that MTF through-focus characteristics obtained from the image pickup lens at the image plane describe a curve that has an MTF peak when the image plane is positioned on a negative side of an optical axis direction and declines as the image plane is defocused towards a positive side of the optical axis direction. According to this preferred example, it is possible to allow the resolution on the near point side to have an edge over that on the far point side as needed.

Further, in the configuration of the image pickup lens of the present invention, it is preferable that one of any two of the areas of the multifocal lens surface is shifted relative to the other of the any two of the areas along the direction of the optical axis so that light rays that respectively pass through the any two of the areas have a certain phase difference. This preferred example makes it easier to control the image pickup lens to have a large focal depth from the center to the outer part of an image plane formed on the image sensor.

Further, in the configuration of the image pickup lens of the present invention, when a maximum value of a point spread function (PSF) obtained from the image pickup lens at a given image point is 1, and L is a width of the point spread function in which the spread becomes 0.01 or more, it is preferable that L and P satisfy the following conditional expression (3).

$$4 \leq L/P \leq 20 \tag{3}$$

Where P is a pixel pitch of the image sensor.

When an image pickup lens with a large focal depth from the center to the outer part of an image plane formed on an image sensor is used to shoot a subject with a high level of brightness, flare may occur due to a point becoming out of focus. However, according to the preferred example in which the conditional expression (3) is satisfied, it is possible to control the image pickup lens to have a large focal depth from the center to the outer part of an image plane formed on the image sensor, and to suppress the occurrence of flare when shooting a subject with a high level of brightness.

Further, the image pickup device of the present invention is an image pickup device including an image pickup lens, an image sensor for detecting an image formed by the image pickup lens, and a restoration device for restoring an image detected by the image sensor. The image pickup device of the present invention uses, as the image pickup lens, the image pickup lens of the present invention.

According to the configuration of the image pickup device of the present invention, since the image pickup device of the present invention uses, as the image pickup lens, the image pickup lens of the present invention, it is possible to provide a compact and high-resolution performance image pickup device.

Further, the portable apparatus of the present invention is equipped with the image pickup device of the present invention.

According to the configuration of the portable apparatus of the present invention, since the portable apparatus of the present invention is equipped with the image pickup device of the present invention, it is possible to provide a compact and high-performance portable apparatus such as a mobile phone.

Effects of the Invention

As described above, according to the present invention, it is possible to provide an image pickup lens with a large focal depth from the center to the outer part of an image plane formed on an image sensor and capable of maintaining its focal depth within a practical range and thus suppressing a decline in the resolution. Further, it is also possible to provide a compact and high-resolution performance image pickup device using the image pickup lens and a compact and high-performance portable apparatus equipped with the image pickup device.

DESCRIPTION OF THE INVENTION

Hereinafter, the present invention will be described in more detail by way of embodiments.

Embodiment 1

Figure 1:
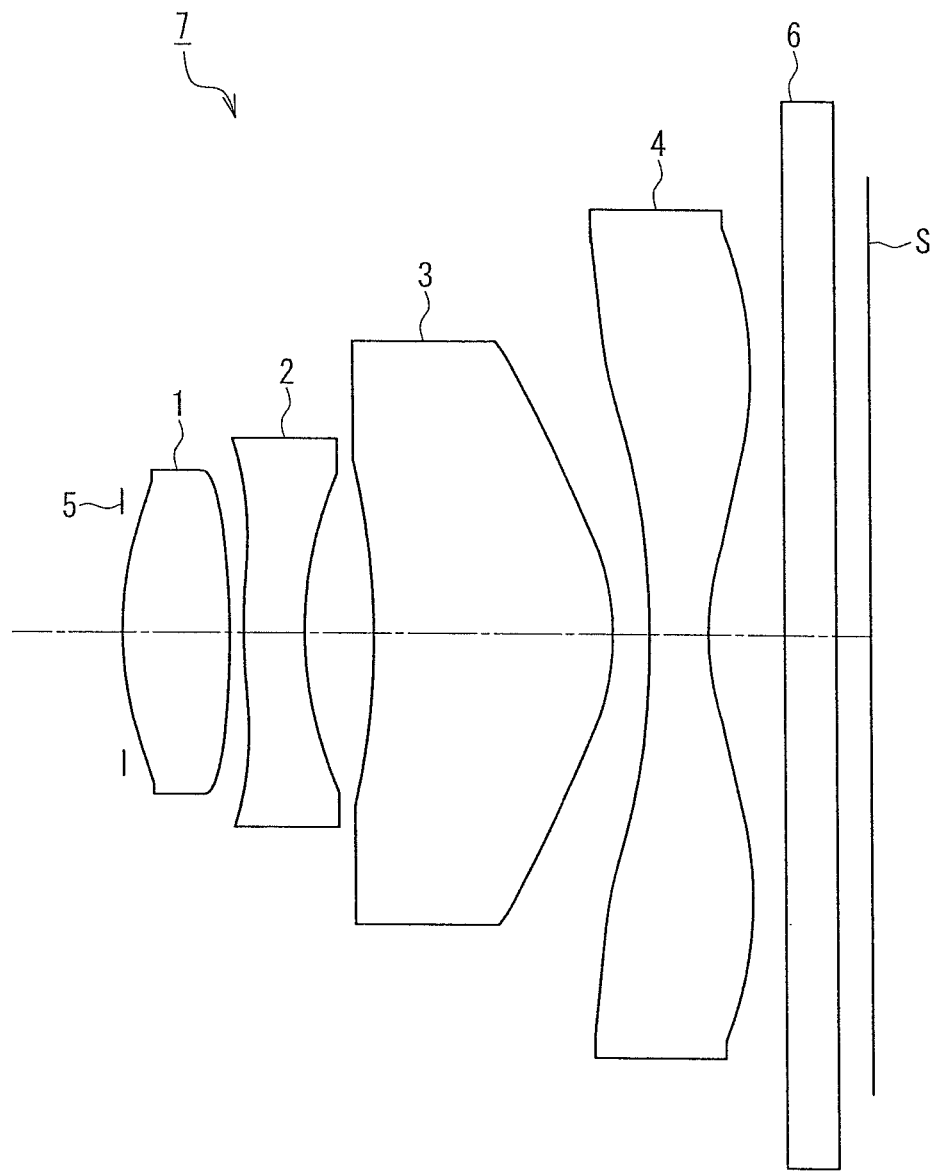
FIG. 1 is a layout diagram showing a configuration of an image pickup lens according to Embodiment 1 of the present invention.

FIG. 1 is a layout diagram showing a configuration of an image pickup lens according to Embodiment 1 of the present invention.

An image pickup lens 7 according to the present embodiment includes at least one lens, and is for use in an image pickup device for restoring images detected by an image sensor. Further, the image pickup lens 7 according to the present embodiment includes, on at least one lens surface of the at least one lens, a multifocal lens surface having a plurality of surface areas having different focal points, and an aperture stop is placed adjacent to the multifocal lens surface. And in the image pickup lens 7 according to the present embodiment, when D is the absolute value of the distance between the multifocal lens surface and a surface of the aperture stop on the optical axis, and Ymax is the absolute value of the maximum image height on an image plane formed on the image sensor, D and Ymax satisfy the following conditional expression (1).

$$0 \leq D/Y\mathrm{max} \leq 0.1 \tag{1}$$

If the image pickup lens 7 is configured as above, it is possible to provide an image pickup lens having aberration characteristics that facilitate the restoration of images detected by an image sensor at high resolution and with a large focal depth from the center to the outer part of an image plane formed on the image sensor. That is, if the image pickup lens 7 is configured as above, it is possible to provide an image pickup lens with a large focal depth from the center to the outer part of an image plane formed on the image sensor, and capable of maintaining its focal depth within a practical range and thus suppressing a decline in the resolution.

As shown in FIG. 1, the image pickup lens 7 according to the present embodiment includes, for example, in order from the object side (the left side of FIG. 1) to the image plane side (the right side of FIG. 1); an aperture stop 5; a first lens 1 that is a biconvex lens having positive power; a second lens 2 that is a meniscus lens having negative power and whose lens surface facing the object side is convex; a third lens 3 that is a meniscus lens having positive power and whose lens surface facing the object side is concave; and a fourth lens 4 that is a biconcave lens having negative power. And the image pickup lens 7 according to the present embodiment includes a multifocal lens surface on the lens surface of the first lens 1 facing the object side (the aperture stop 5 is placed adjacent to the multifocal lens surface).

Here, the term power refers to an amount defined by the inverse of the focal distance. Further, the aperture stop 5 has a circular aperture.

A transparent parallel plate 6 is disposed between the fourth lens 4 and the image pickup surface S of an image sensor. Here, the parallel plate 6 is a plate equivalent to an optical low-pass filter, an infrared (IR) cut filter and a faceplate (cover glass) of the image sensor.

The surfaces from the lens surface of the first lens 1 facing the object side to the surface of the parallel plate 6 facing the image plane side (hereinafter also referred to as "optical surfaces") will be referred to as, in order from the object side, a "first surface", a "second surface", a "third surface", a "fourth surface" . . . an "eighth surface", a "ninth surface", and a "tenth surface", respectively (the same is true also for Embodiments 2 and 3 described later).

In the configuration of the image pickup lens 7 according to the present embodiment, when f1 and f2 are focal distances of any two of the areas of the multifocal lens surface, it is desirable that f1 and f2 satisfy the following conditional expression (2).

$$0.95 \leq f1/f2 \leq 1.05 \qquad (2)$$

In this way, if the difference in focal distance between any two of the areas of the multifocal lens surface is within ±5%, an image plane formed on the image sensor is likely to have uniform resolution performance at a continuous range of subject distances from far to near subject distances. On the other hand, if f1 and f2 do not satisfy the conditional expression (2), the resolution is less likely to be adequate at a subject distance intermediate between far and near subject distances.

It should be noted that as long as at least one of the any two of the areas of the multifocal lens surface is aspherical and the any two of the areas have different aspherical coefficients and/or conic constants, an image plane formed on the image sensor is likely to have uniform resolution performance at a continuous range of subject distances from far to near subject distances even if the any two of the areas have the same focal distance (f1/f2=1.00).

The aspherical shape of each of the lens surfaces can be given by the following formula 1 (the same is true also for Embodiments 2 and 3 described later).

$$X = \frac{\frac{Y^2}{R_0}}{1 + \sqrt{1 - (\kappa + 1)\left(\frac{Y}{R_0}\right)^2}} + \qquad \text{[Formula 1]}$$
$$A4Y^4 + A6Y^6 + A8Y^8 + A10Y^{10} + \ldots$$

Where Y represents the height from the optical axis, X represents a distance from a tangent plane to the vertex of an aspherical surface of an aspherical shape at height Y from the optical axis, $R_0$ represents the radius of curvature of the vertex of the aspherical surface, κ represents a conic constant, and A4, A6, A8, and A10 . . . represent 4th-, 6th-, 8th-, and 10th- . . . order aspherical coefficients, respectively.

Further, in the configuration of the image pickup lens 7 according to the present embodiment, it is desirable that the boundary of the areas is concentric with the optical axis. If the image pickup lens 7 is configured in this way, the multifocal lens surface becomes rotationally symmetrical to the optical axis. This makes it easy to produce the lens and a mold for the lens.

Further, in the configuration of the image pickup lens 7 according to the present embodiment, it is desirable that the image pickup lens 7 includes a diffractive optical element surface on at least one lens surface of the at least one lens. The image pickup lens 7 according to the present embodiment shown in FIG. 1 includes a diffractive optical element surface on the lens surface of the first lens 1 facing the image plane side.

For example, the shape of the diffractive optical element surface can be given by the following formula 2 (the same is true also for Embodiments 2 and 3 described later).

$$\Phi(\rho) = (2\pi/\lambda_0)(C2\rho^2 + C4\rho^4)$$

$$Y = \rho \qquad \text{[Formula 2]}$$

Where Φ(ρ) represents the phase function, Y represents the height from the optical axis, Cn represents nth-order phase coefficient, and $\lambda_0$ represents a design wavelength. Note that X is determined by shape converting Φ(ρp) at an M-th diffraction order.

When the level of longitudinal chromatic aberration increases, image characteristics of a fixed image plane at each wavelength vary depending on the object distance. However, since an image restoration system cannot acquire object distance information, it becomes difficult to achieve favorably restored images at various object distances. For this reason, it is necessary to reduce the level of longitudinal chromatic aberration as much as possible. Further, when a chromatic aberration of magnification increases, the resolution of an image plane perpendicular to the optical axis declines. Generally, the chromatic aberration of magnification varies depending on the image height (the aberration is 0 at the center). If image characteristics vary depending on the image height, it becomes difficult to achieve favorably restored images. For this reason, it is necessary to reduce the chromatic aberration of magnification as much as possible without depending on the image height. If the image pickup lens includes a diffractive optical element surface on at least one lens surface of the at least one lens, chromatic aberration can be corrected favorably through the diffractive optical element surface. As a result, it is possible to provide an image pickup lens with a large focal depth more suitable for an image restoration system.

Further, in the configuration of the image pickup lens 7 according to the present embodiment, it is desirable that MTF through-focus characteristics obtained from the image pickup lens 7 at the image plane describe a curve that has an MTF peak when the image plane is positioned on the positive side of the optical axis direction and declines as the image plane is defocused towards the negative side of the optical axis direction. This can give the resolution on the far point side an edge over that on the near point side as needed.

Further, in the configuration of the image pickup lens 7 according to the present embodiment, it is desirable that MTF through-focus characteristics obtained from the image pickup lens 7 at the image plane describe a curve that has an MTF peak when the image plane is positioned on the negative side of the optical axis direction and declines as the image plane is defocused towards the positive side of the optical axis direction. This can give the resolution on the near point side an edge over that on the far point side as needed. Further, in this case, it is desirable that the area of the multifocal lens surface having a certain focal point has a smaller focal distance than that of the outer area (in the peripheral direction). This can give the resolution on the near point side an edge over that on the far point side more easily.

Example 1

Hereinafter, the image pickup lens according to the present embodiment will be described in more detail by way of a specific example.

Table 1 below provides a specific numerical example of an image pickup lens in this example.

TABLE 1

| Surface number | r (mm) | d (mm) | n | ν |
|---|---|---|---|---|
| Aperture stop | ∞ | 0.000 | — | — |
| 1st surface* | 1.490 | 0.630 | 1.53113 | 55.8 |
| 2nd surface** | −9.061 | 0.100 | — | — |
| 3rd surface | 12.723 | 0.350 | 1.607 | 27.59 |
| 4th surface | 2.255 | 0.399 | — | — |
| 5th surface | −5.225 | 1.404 | 1.53113 | 55.8 |
| 6th surface | −0.965 | 0.208 | — | — |
| 7th surface | −8.721 | 0.350 | 1.53113 | 55.8 |
| 8th surface | 0.995 | 0.458 | — | — |
| 9th surface | ∞ | 0.300 | 1.5168 | 64.2 |
| 10th surface | ∞ | 0.200 | — | — |
| Image plane | ∞ | — | — | — |

In Table 1, r (mm) is the radius of curvature of each optical surface, d (mm) is the thickness or distance between each pair of adjacent surfaces of the first lens 1 to the fourth lens 4 and the parallel plate 6 on the optical axis, n is the refractive index of each of the first lens 1 to the fourth lens 4 and the parallel plate 6 at the d line (587.5600 nm), and ν is the Abbe number of each of the first lens 1 to the fourth lens 4 and the parallel plate 6 at the d line (the same is true also for Examples 2 and 3 described later). Note that the image pickup lens 7 shown in FIG. 1 is configured based on the data provided in Table 1.

Further, Tables 2A, 2B, and 2C below each provide aspherical coefficients (including conic constants) of the image pickup lens in this example. In Tables 2A, 2B, and 2C, for example, "E+00" and "E−02" represent "$10^{+00}$" and "$10^{-02}$", respectively (the same is true also for Table 3 and Examples 2 and 3 described later).

TABLE 2A

| | | κ | A4 |
|---|---|---|---|
| 1st surface* | Up to 0.38 mm radius | −5.4708E−01 | 7.2688E−03 |
| | 0.38 mm radius or more | −9.0000E−01 | 7.2688E−03 |
| | 2nd surface** | 1.0518E+02 | −7.6699E−02 |
| | 3rd surface | 0.0000E+00 | −6.5851E−02 |

TABLE 2A-continued

| | κ | A4 |
|---|---|---|
| 4th surface | −1.3848E+00 | 5.6453E−02 |
| 5th surface | 2.0429E+01 | −2.6430E−02 |
| 6th surface | −4.4556E+00 | −8.4670E−02 |
| 7th surface | 0.0000E+00 | −1.1020E−01 |
| 8th surface | −6.7574E+00 | −9.2973E−02 |

TABLE 2B

| | | A6 | A8 |
|---|---|---|---|
| 1st surface* | Up to 0.38 mm radius | −2.6731E−02 | −5.1795E−02 |
| | 0.38 mm radius or more | −2.6731E−02 | −5.1795E−02 |
| | 2nd surface** | −1.4271E−01 | 1.3863E−01 |
| | 3rd surface | −1.2111E−01 | 1.8071E−01 |
| | 4th surface | −4.8631E−03 | 8.4770E−02 |
| | 5th surface | −3.1296E−02 | 1.6763E−02 |
| | 6th surface | 5.2303E−02 | −3.1486E−02 |
| | 7th surface | 4.1745E−02 | 4.0604E−03 |
| | 8th surface | 4.3072E−02 | −1.4261E−02 |

TABLE 2C

| | | A10 | A12 | A14 |
|---|---|---|---|---|
| 1st surface* | Up to 0.38 mm radius | −1.0502E−01 | 3.3210E−01 | −6.1064E−01 |
| | 0.38 mm radius or more | −1.0502E−01 | 3.3210E−01 | −6.1064E−01 |
| | 2nd surface** | 3.7872E−02 | −5.8129E−01 | 3.6249E−01 |
| | 3rd surface | 2.4603E−01 | −9.0910E−01 | 5.6167E−01 |
| | 4th surface | 1.5897E−01 | −1.7564E−01 | 8.8264E−03 |
| | 5th surface | −1.4094E−02 | 4.3735E−02 | 0.0000E+00 |
| | 6th surface | 1.7002E−02 | −1.4930E−03 | −8.5128E−04 |
| | 7th surface | −3.5364E−03 | 3.8843E−04 | 0.0000E+00 |
| | 8th surface | 2.5468E−03 | −1.8503E−04 | 0.0000E+00 |

As can be seen from Tables 2A, 2B and 2C, in the image pickup lens 7 of this example, the lens surfaces of the first lens 1 to the fourth lens 4 are all aspherical. It should be noted, however, that the image pickup lens 7 is not necessarily limited to such a configuration.

Further, in Tables 1, 2A, 2B and 2C, the surface marked with an asterisk (the first surface: the lens surface of the first lens 1 facing the object side) is a multifocal lens surface. The multifocal lens surface is divided into two areas, the boundary of which is a circle having a radius of 0.38 mm and concentric with the optical axis. These two areas have the same focal distance (radius of curvature) but have different conic constants. Further, in order to prevent the occurrence of flare, these two areas have the same amount of sag at the boundary so as to eliminate a difference in level. That is, since a difference in level at the boundary of the two areas results in flare, such a difference in level is eliminated to prevent the occurrence of flare. It should be noted, however, that it is permissible to have a difference in level as long as the size is about a fraction of the design wavelength to several times larger than the design wavelength, and new effects can be expected from such a level of difference (see Embodiment 4 described later).

Further, in Tables 1, 2A, 2B, and 2C, the surface marked with two asterisks (the second surface: the lens surface of the first lens 1 facing the image plane side) is a diffractive optical element surface, and a specific numerical example of the diffractive optical element surface is provided in Table 3 below.

TABLE 3

| Design wavelength | 546.07 nm |
|---|---|
| Diffraction order | 1 |
| C2 | −4.8653E−03 |
| C4 | 3.1053E−03 |

The image pickup lens 7 of this example includes the multifocal lens surface on the lens surface of the first lens 1 facing the object side. It should be noted, however, that the image pickup lens 7 is not necessarily limited to such a configuration. The same effects can be achieved even if the image pickup lens 7 includes the multifocal lens surface on the lens surface of the first lens 1 facing the image plane side or the lens surface of any of the second lens 2 to the fourth lens 4 facing the object side or the image plane side. Further, the image pickup lens 7 may include the multifocal lens surfaces on two or more of the lens surfaces.

Further, the image pickup lens 7 of this example includes the diffractive optical element surface on the lens surface of the first lens 1 facing the image plane side. It should be noted, however, that the image pickup lens 7 is not necessarily limited to such a configuration. The same effect can be achieved even if the image pickup lens 7 includes the diffractive optical element surface on the lens surface of the first lens 1 facing the object side or the lens surface of any of the second lens 2 to the fourth lens 4 facing the object side or the image plane side. Further, the image pickup lens 7 also may include the diffractive optical element surface on a lens surface that is a multifocal lens surface. Further, the image pickup lens 7 may also include the diffractive optical element surfaces on two or more of the lens surfaces. Moreover, in terms of correcting chromatic aberration, it is preferable that the image pickup lens 7 includes the diffractive optical element surface on a lens surface relatively close to the aperture stop.

Further, Table 4 below provides the F number Fno, the focal distance f (mm) of the image pickup lens 7 as a whole resulting from an area constituting the apex of the multifocal lens surface, the overall optical length TL (mm) measured not in terms of air, the maximum image height Y', the diameter (mm) of the aperture of the aperture stop 5, and the value of each of the conditional expressions (1) and (2) associated with the image pickup lens 7 of this example.

TABLE 4

| Fno | 2.8 |
|---|---|
| f (mm) | 3.5 |
| TL (mm) | 4.4 |
| Y' (mm) | 2.3 |
| Diameter of aperture stop (mm) | 1.24 |
| Diffractive optical element surface | Yes |
| Conditional Expression (1): D/Ymax | 0 |
| Conditional Expression (2): f1/f2 | 1.00 |

As shown in Table 4, the maximum image height Y' is 2.3 mm. Thus, the image pickup lens 7 of this example is compatible with a ¼ inch solid-state image pickup element as the image sensor.

Figure 2A:
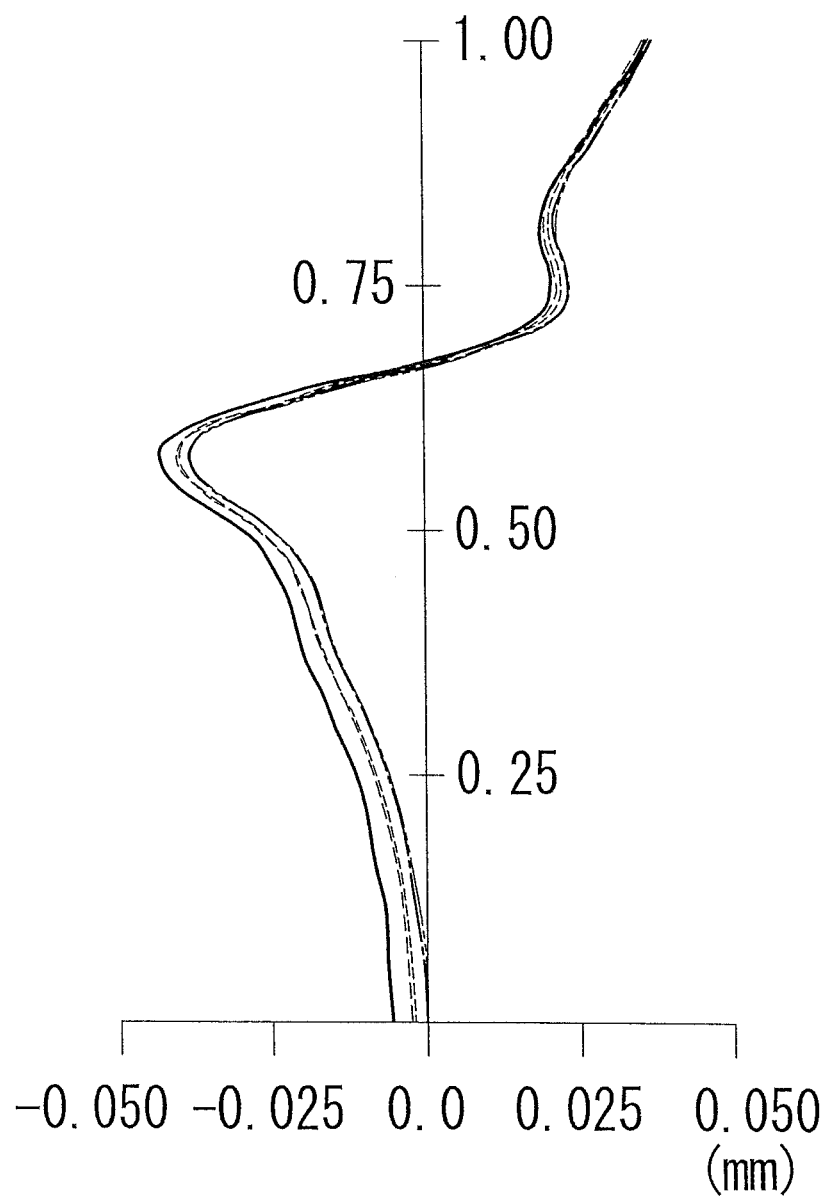
FIG. 2A is a graph showing spherical aberration of the image pickup lens in Example 1 of the present invention.
Figure 2B:
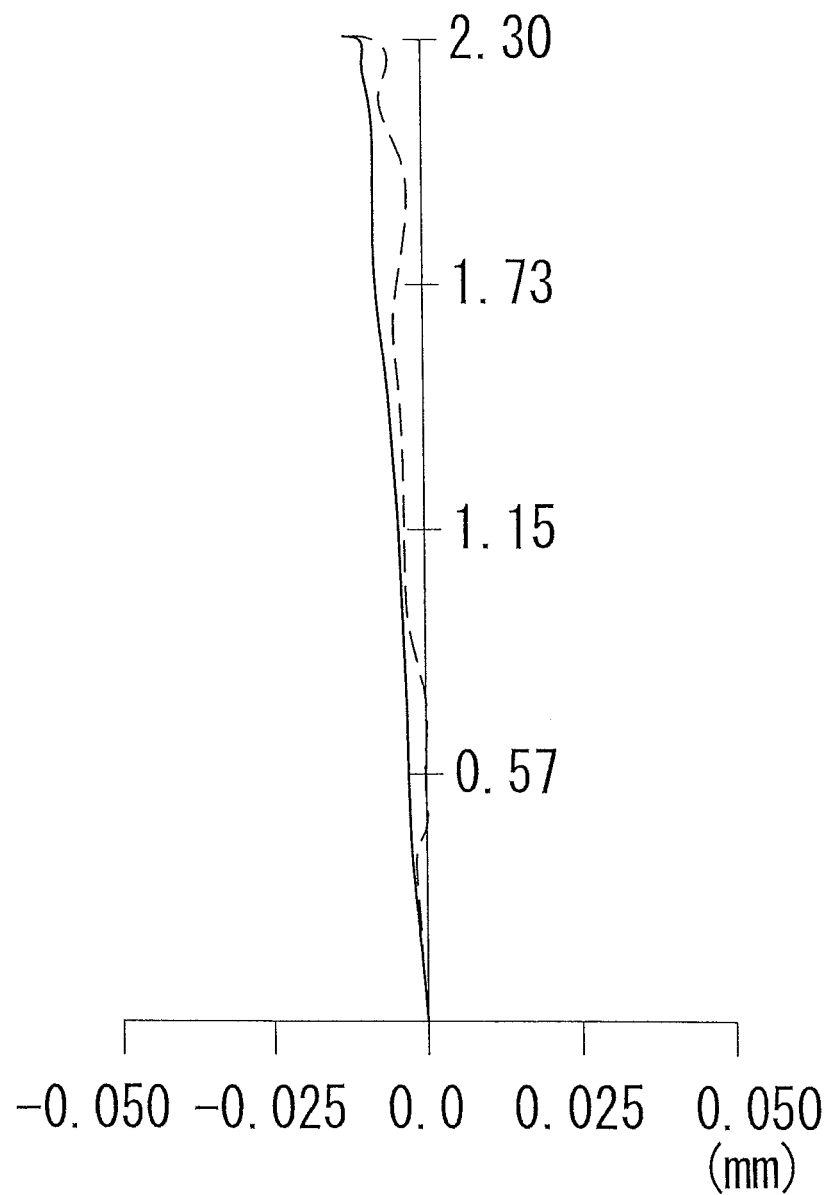
FIG. 2B is a graph showing astigmatism of the image pickup lens in Example 1 of the present invention.
Figure 2C:
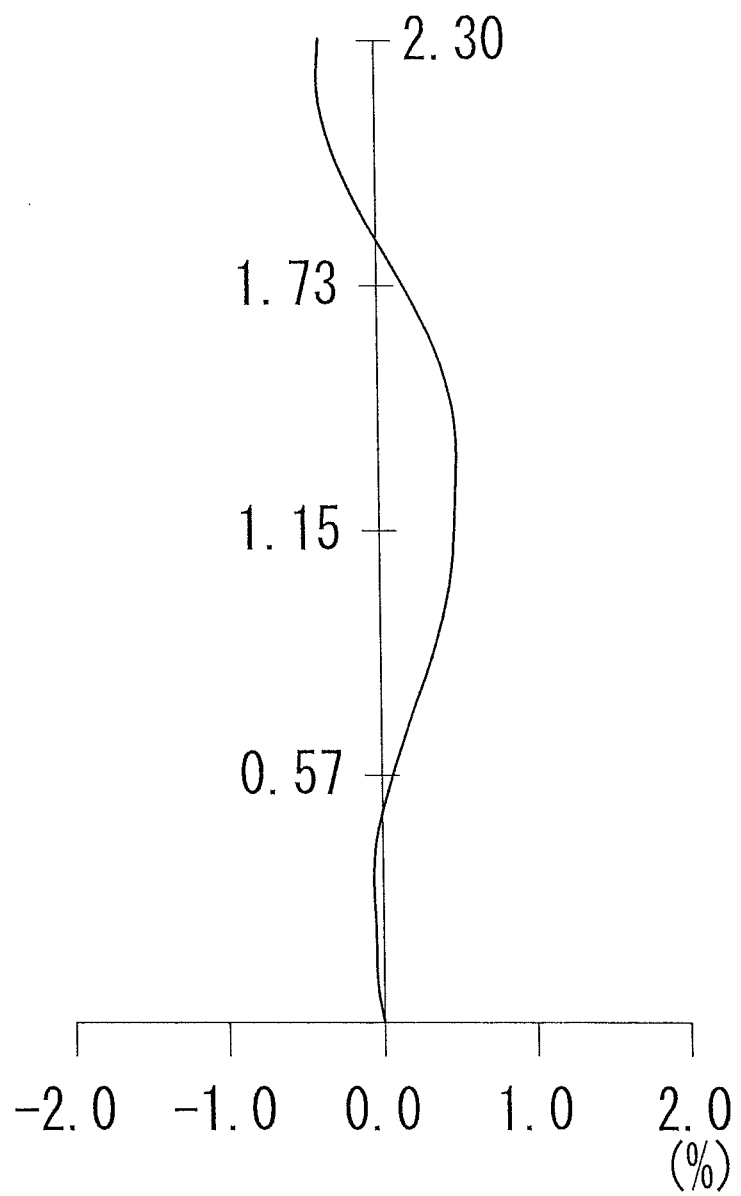
FIG. 2C is a graph showing distortion of the image pickup lens in Example 1 of the present invention.

FIGS. 2A to 2C show graphs of aberrations of the image pickup lens in this example. FIG. 2A is a graph showing spherical aberration. In FIG. 2A, a solid line indicates values at the g line (435.8300 nm), a long dashed line indicates values at the C line (656.2700 nm), a short dashed line indicates values at the F line (486.1300 nm), a double dashed line indicates values at the d line (587.5600 nm), a chain line indicates values at the e line (546.0700 nm). FIG. 2B is a graph showing astigmatism. In FIG. 2B, a solid line indicates a sagittal field curvature and a dashed line indicates a meridional field curvature. FIG. 2C is a graph showing distortion. Note that longitudinal chromatic aberration can be read from the graph showing spherical aberration in FIG. 2A.

As can been seen from the graphs of aberrations shown in FIGS. 2A to 2C, while the level of spherical aberration is large due to the multifocal lens surface for attaining a large focal depth, chromatic aberration is corrected favorably as a result of having the diffractive optical element surface. Consequently, it is possible to provide an image pickup lens with a large focal depth more suitable for an image restoration system. Further, as is clear from the fact that field curvature and astigmatism are corrected favorably, uniform resolution characteristics can be achieved regardless of the image height. Further, distortion is also corrected favorably.

Figure 3:
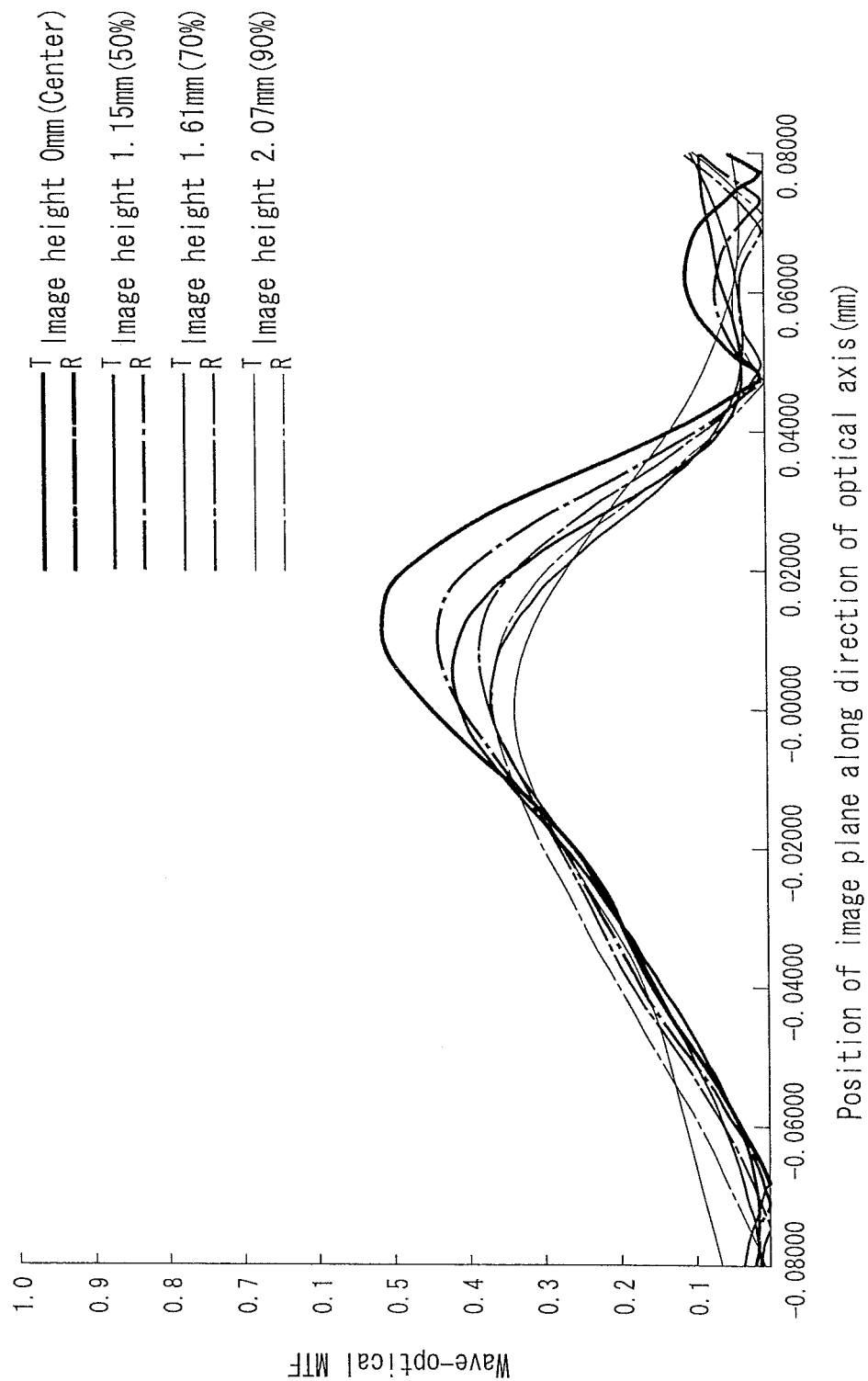
FIG. 3 is a graph showing MTF through-focus characteristics obtained from the image pickup lens in Example 1 of the present invention at an image plane.

FIG. 3 shows MTF through-focus characteristics obtained from the image pickup lens in this example at an image plane. The vertical axis of FIG. 3 represents wave-optical MTF (120 lines/mm) at an object distance of 60 cm and the horizontal axis of FIG. 3 represents the position of the image plane along the direction of the optical axis. FIG. 3 shows the MTF at the center, 50%, 70%, and 90% image heights, where the maximum image height is 2.3 mm. In FIG. 3, the letter "T" denotes the MTF in the meridional direction, and the letter "R" denotes the MTF in the sagittal direction (the same is true for FIGS. 4, 8 and 11).

As shown in FIG. 3, MTF through-focus characteristics obtained from the image pickup lens of this example at the image plane describe a curve that has an MTF peak when the image plane is positioned on the positive side of the optical axis direction and declines as the image plane is defocused towards the negative side of the optical axis direction. This can give the resolution on the far point side an edge over that on the near point side as needed.

It should be noted that the MTF shown in FIG. 3 is white-color MTF, and the proportion of the C line (656.2700 nm), the d line (587.5600 nm), the e line (546.0700 nm), the F line (486.1300 nm) and the g line (435.8300 nm) is 5:25:34:22:14. It should be noted that the above effects can be achieved regardless of the proportion of the wavelengths.

Figure 4:
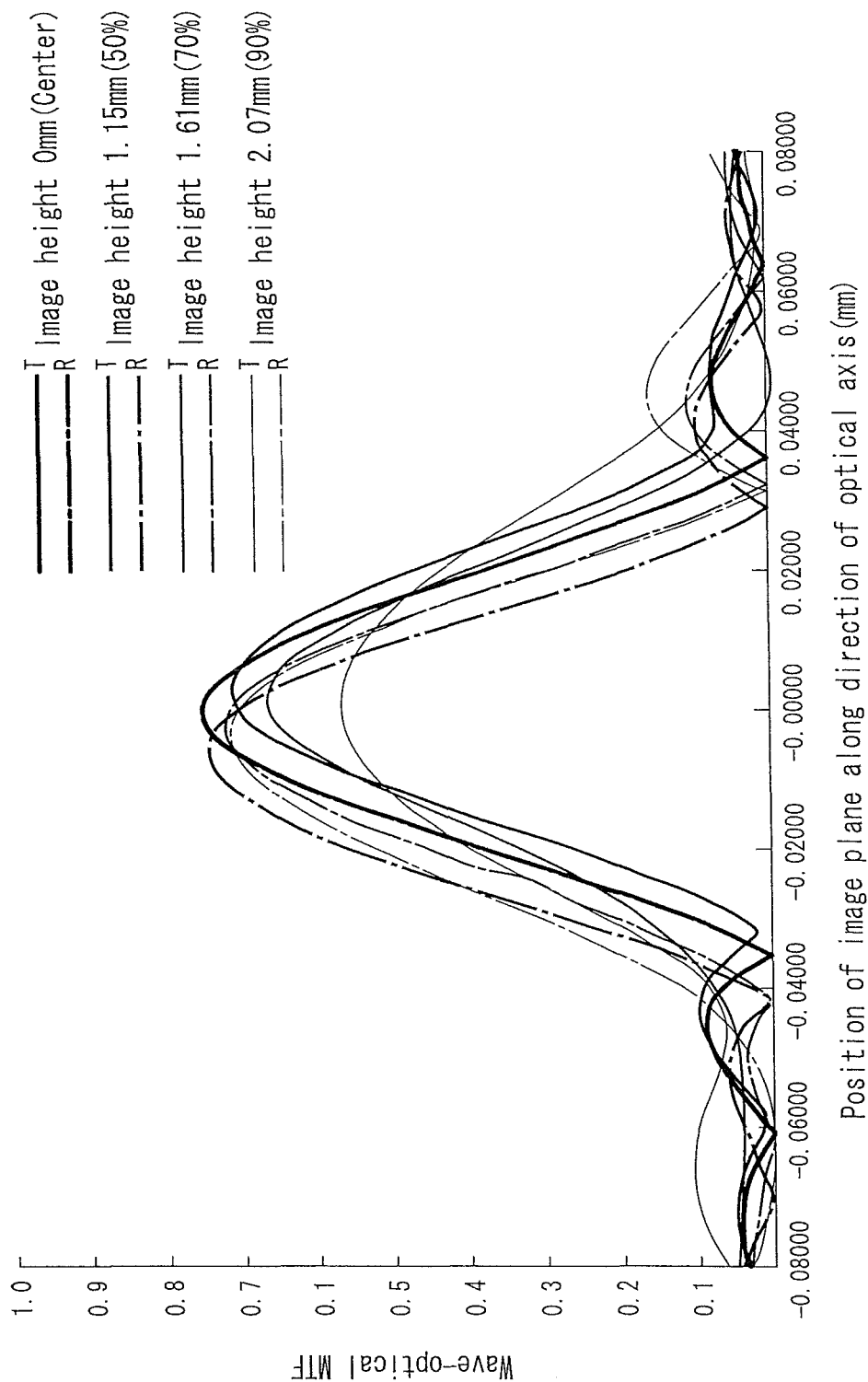
FIG. 4 is a diagram showing MTF through-focus characteristics obtained from a typical image pickup lens at an image plane. In the typical image pickup lens, the focal distance, the maximum image height and the F number are the same as those in the image pickup lens in the example of the present invention, and various aberrations are corrected favorably.

FIG. 4 shows MTF through-focus characteristics obtained from a typical image pickup lens at an image plane. In this typical image pickup lens, the focal distance f (mm), the maximum image height Y' and the F number Fno are the same as those in the image pickup lens of this example, and various aberrations have been corrected favorably.

A comparison of FIGS. 3 and 4 clearly shows that the image pickup lens of this example has a larger focal depth than that of the typical image pickup lens. Further, it is clear that a large focal depth is ensured in the case of the image pickup lens of this example even at large image heights.

Here, through-focus MTF at an object distance of 60 cm is shown. At an infinite object distance and a near object distance, through-focus MTF describes a curve roughly similar to that described by through-focus MTF at an object distance of 60 cm but the curve shifts along the direction of the optical axis. More specifically, through-focus MTF at an infinite object distance describes a curve roughly similar to that described by through-focus MTF at an object distance of 60 cm but the curve shifts towards the image pickup lens. On the other hand, through-focus MTF at a near object distance describes a curve roughly similar to that described by through-focus MTF at an object distance of 60 cm but the curve shifts towards the opposite side to the image pickup lens. With this in mind, given that an image plane is fixed to, for example, the origin point of the horizontal axis of FIG. 3, MTF at this image plane increases at an infinite object distance and declines gradually as the object distance decreases in this example. When shooting a distant object, a higher resolution is generally required on the far point side where the amount of information on the shooting subject is large (large shooting area). This is effective on such a demand. In contrast, when a higher resolution is required on the near point side, the optical design may be performed in view of such a demand.

Figure 5:
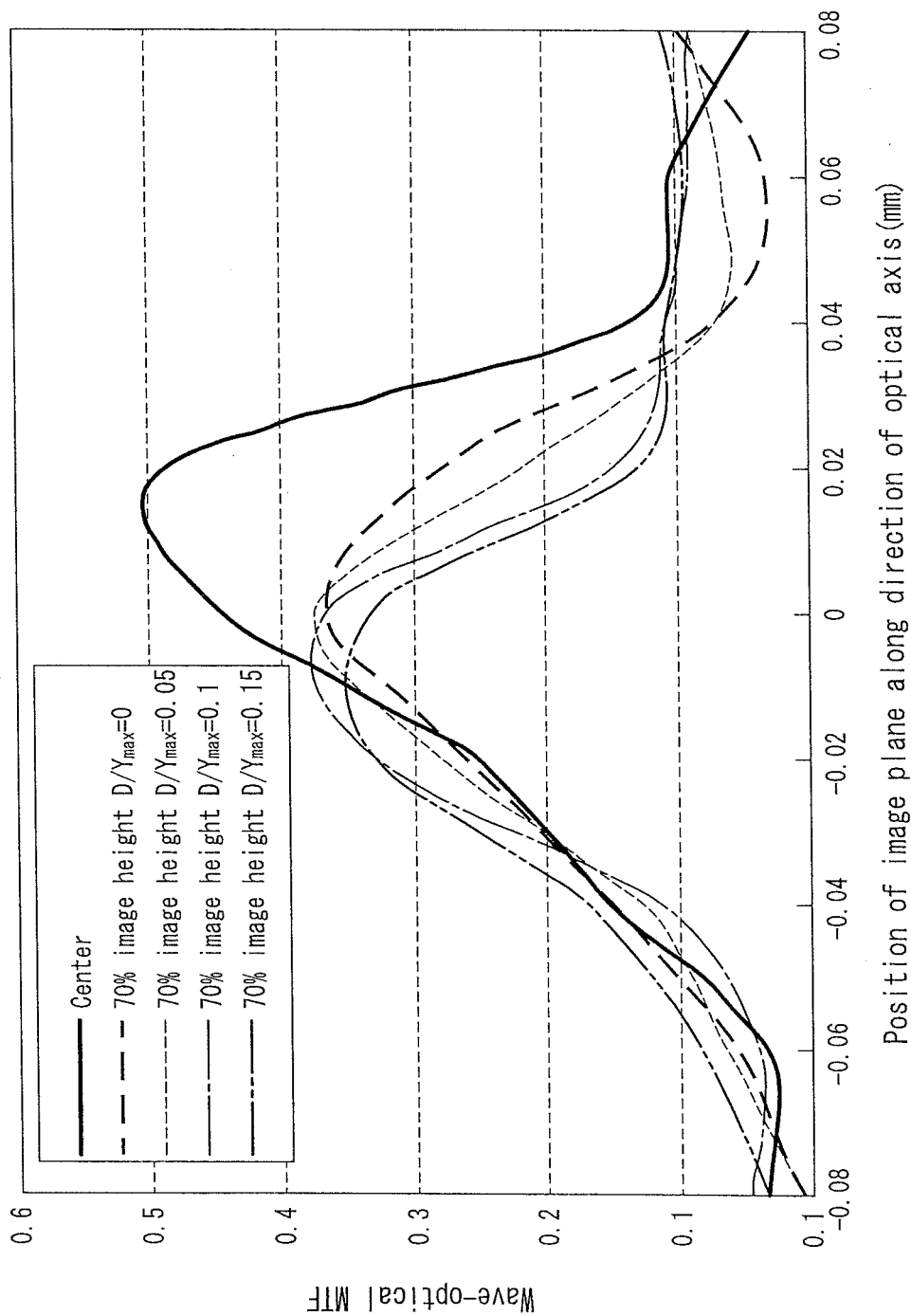
FIG. 5 is a graph showing through-focus MTF at the time of moving an aperture stop toward an object along the optical axis in Example 1 of the present invention.

Next, consideration is given to the distance between the multifocal lens surface and the aperture stop of the image pickup lens on the optical axis. FIG. 5 shows through-focus MTF at the time of moving the aperture stop toward the object along the optical axis in this example. The phrase "moving the aperture stop toward the object along the optical axis" means that the distance is increased between the aperture stop 5 and the multifocal lens surface provided on the lens surface of the first lens 1 facing the object side. FIG. 5 shows through-focus MTF at a 70% image height at D/Ymax=0, D/Ymax=0.05, D/Ymax=0.1, and D/Ymax=0.15, where D is the absolute value of the distance between the multifocal lens surface and the surface of the aperture stop 5 on the optical axis, and Ymax is the absolute value of the maximum image height on an image plane formed on the image sensor by the image pickup lens 7. In this example, since the aperture stop is provided adjacent to the lens surface of the first lens facing the object side, the movement of the aperture stop causes no change in MTF at the center. As can be seen from FIG. 5, when D/Ymax becomes larger than 0.1, MTF at the center deviates from MTF at a 70% image height. This is because the center of a pencil of rays (principal ray) focused on a higher image height part of the multifocal lens surface deviates from the optical axis as the distance between the multifocal lens surface and the surface of the aperture stop 5 on the optical axis increases, and it becomes difficult to adequately attain "the effect of increasing the focal depth" resulting from the multifocal lens surface. In order to attain a large focal depth from the central part (center) to the outer part (high image height part) of the image plane, it is necessary that the conditional expression (1) is satisfied.

Embodiment 2

Figure 6:
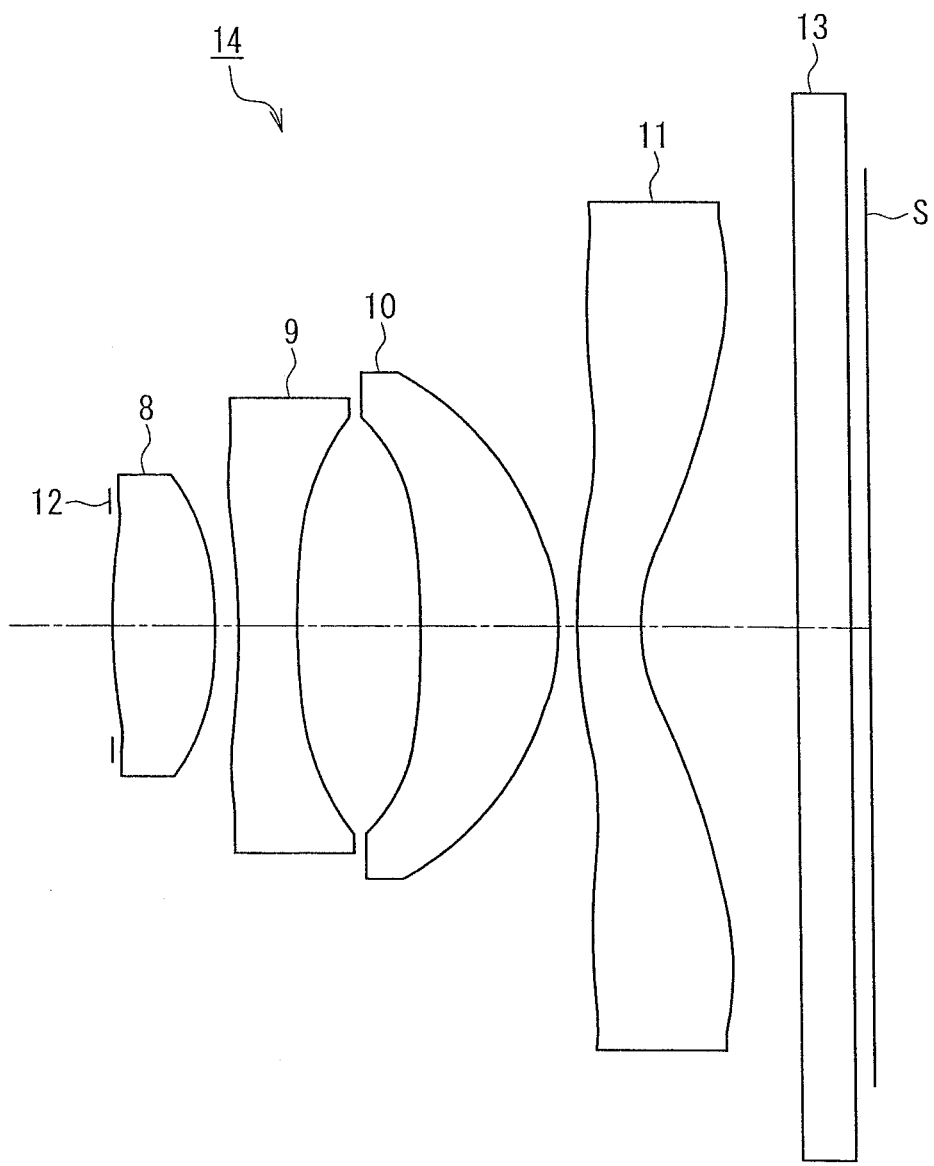
FIG. 6 is a layout diagram showing a configuration of an image pickup lens according to Embodiment 2 of the present invention.

FIG. 6 is a layout diagram showing a configuration of an image pickup lens according to Embodiment 2 of the present invention.

An image pickup lens 14 according to the present embodiment includes at least one lens, and is for use in an image pickup device for restoring images detected by an image sensor. Further, the image pickup lens 14 according to the present embodiment includes, on at least one lens surface of the at least one lens, a multifocal lens surface having a plurality of surface areas having different focal points, and an aperture stop is placed adjacent to the multifocal lens surface. Also in the image pickup lens 14 according to the present embodiment, the conditional expression (1) is satisfied.

As shown in FIG. 6, the image pickup lens 14 according to the present embodiment includes, for example, in order from the object side (the left side of FIG. 6) to the image plane side (the right side of FIG. 6): an aperture stop 12; a first lens 8 that is a biconvex lens having positive power; a second lens 9 that is a biconcave lens having negative power; a third lens 10 that is a meniscus lens having positive power and whose lens surface facing the object side is concave; and a fourth lens 11 that is a meniscus lens having negative power and whose lens surface facing the object side is convex. And the image pickup lens 14 according to the present embodiment includes a multifocal lens surface on the lens surface of the first lens 8 facing the object side (the aperture stop 12 is placed adjacent to the multifocal lens surface).

Here, the aperture stop 12 has a circular aperture.

A transparent parallel plate 13 similar to the parallel plate 6 in Embodiment 1 is disposed between the fourth lens 11 and the image pickup surface S of the image sensor.

Also in the configuration of the image pickup lens 14 according to the present embodiment, it is desirable that the conditional expression (2) is satisfied.

Further, also in the configuration of the image pickup lens 14 according to the present embodiment, it is desirable that the boundary of the areas is concentric with the optical axis.

Further, also in the configuration of the image pickup lens 14 according to the present embodiment, it is desirable that the image pickup lens 14 includes a diffractive optical element surface on at least one lens surface of the at least one lens. The image pickup lens 14 according to the present embodiment shown in FIG. 6 includes a diffractive optical element surface on the lens surface of the first lens 8 facing the image plane side.

Further, also in the configuration of the image pickup lens 14 according to the present embodiment, it is desirable that MTF through-focus characteristics obtained from the image pickup lens 14 at the image plane describe a curve that has an MTF peak when the image plane is positioned on the positive side of the optical axis direction and declines as the image plane is defocused towards the negative side of the optical axis direction.

Further, also in the configuration of the image pickup lens 14 according to the present embodiment, it is desirable that MTF through-focus characteristics obtained from the image pickup lens 14 at the image plane describe a curve that has an MTF peak when the image plane is positioned on the negative side of the optical axis direction and declines as the image plane is defocused towards the positive side of the optical axis direction.

Example 2

Hereinafter, the image pickup lens according to the present embodiment will be described in more detail by way of a specific example.

Table 5 below provides a specific numerical example of an image pickup lens in this example. Note that the image pickup lens 14 shown in FIG. 6 is configured based on the data provided in Table 5.

TABLE 5

| Surface number | r (mm) | d (mm) | n | ν |
|---|---|---|---|---|
| Aperture stop | ∞ | 0.000 | — | — |
| 1st surface* | See FIG. 6A below | 0.608 | 1.53113 | 55.8 |
| 2nd surface** | −1.687 | 0.121 | — | — |
| 3rd surface | −8.058 | 0.349 | 1.607 | 27.59 |
| 4th surface | 2.280 | 0.728 | — | — |
| 5th surface | −3.506 | 0.808 | 1.53113 | 55.8 |
| 6th surface | −0.836 | 0.106 | — | — |
| 7th surface | 1.821 | 0.375 | 1.53113 | 55.8 |
| 8th surface | 0.615 | 0.935 | — | — |
| 9th surface | ∞ | 0.300 | 1.5168 | 64.2 |
| 10th surface | ∞ | 0.113 | — | — |
| Image plane | ∞ | — | — | — |

Further, Tables 6A, 6B, and 6C below each provide aspherical coefficients (including conic constants) of the image pickup lens in this example.

TABLE 6A

|  |  | r (mm) | κ |
|---|---|---|---|
| 1st surface* | Up to 0.37 mm radius | 2.881 | −9.7481E+00 |
|  | From 0.37 to 0.50 mm radius | 2.815 | −9.6269E+00 |
|  | 0.50 mm radius or more | 2.777 | −9.3208E+00 |
|  | 2nd surface** | −1.687 | 1.2560E+00 |
|  | 3rd surface | −8.058 | −9.9000E+01 |
|  | 4th surface | 2.280 | −2.9843E+00 |
|  | 5th surface | −3.506 | −2.0686E+00 |
|  | 6th surface | −0.836 | −4.3728E+00 |
|  | 7th surface | 1.821 | −7.3458E+00 |
|  | 8th surface | 0.615 | −3.5878E+00 |

TABLE 6B

|  |  | A4 | A6 |
|---|---|---|---|
| 1st surface* | Up to 0.37 mm radius | −8.3313E−02 | −1.8034E−01 |
|  | From 0.37 to 0.50 mm radius | −8.2112E−02 | −1.7649E−01 |
|  | 0.50 mm radius or more | −8.2621E−02 | −1.7559E−01 |
|  | 2nd surface** | −7.4963E−02 | −9.3099E−02 |
|  | 3rd surface | −7.2851E−02 | 5.6782E−02 |
|  | 4th surface | 2.4810E−02 | 7.1995E−03 |
|  | 5th surface | −5.3655E−03 | −7.2419E−02 |
|  | 6th surface | −1.5090E−01 | 6.4021E−02 |
|  | 7th surface | −1.3986E−01 | 4.2472E−02 |
|  | 8th surface | −9.2323E−02 | 3.6713E−02 |

TABLE 6C

|  |  | A8 | A10 | A12 |
|---|---|---|---|---|
| 1st surface* | Up to 0.37 mm radius | −1.0848E−01 | −2.2679E−01 | 0.0000E+00 |
|  | From 0.37 to 0.50 mm radius | −1.1207E−01 | −2.3365E−01 | 0.0000E+00 |
|  | 0.50 mm radius or more | −1.0672E−01 | −2.4510E−01 | 0.0000E+00 |
|  | 2nd surface** | 1.7394E−01 | −2.3739E−01 | 0.0000E+00 |
|  | 3rd surface | 2.2284E−01 | −1.2059E−01 | −2.8219E−02 |
|  | 4th surface | 3.8363E−02 | 3.1289E−02 | −3.5318E−02 |
|  | 5th surface | −1.0205E−02 | −1.6785E−03 | −1.7687E−02 |
|  | 6th surface | −4.4463E−02 | 9.0614E−03 | −4.0455E−03 |
|  | 7th surface | −9.6258E−04 | −1.1058E−03 | 1.0719E−04 |
|  | 8th surface | −9.9516E−03 | 1.5683E−03 | −1.1060E−04 |

As can be seen from Tables 6A, 6B and 6C, in the image pickup lens 14 of this example, the lens surfaces of the first lens 8 to the fourth lens 11 are all aspherical. It should be noted, however, that the image pickup lens 14 is not necessarily limited to such a configuration.

Further, in Tables 5, 6A, 6B and 6C, the surface marked with an asterisk (the first surface: the lens surface of the first lens 8 facing the object side) is a multifocal lens surface. The multifocal lens surface is divided into three areas, the boundaries of which are circles having a radius of 0.37 mm and 0.50 mm, respectively, and concentric with the optical axis. These three areas have different focal distances (radiuses of curvature), conic constants and aspherical coefficients. Further, in order to prevent the occurrence of flare, these three areas have the same amount of sag at the boundaries so as to eliminate a difference in level. It should be noted that, also in this case, it is permissible to have a difference in level as long as the size is about a fraction of the design wavelength to several times larger than the design wavelength, and new effects can be expected from such a level of difference (see Embodiment 4 described later).

Further, in Tables 5, 6A, 6B and 6C, the surface marked with two asterisks (the second surface: the lens surface of the first lens 8 facing the image plane side) is a diffractive optical element surface, and a specific numerical example of the diffractive optical element surface is provided in Table 7 below.

TABLE 7

| Design wavelength | 546.07 nm |
|---|---|
| Diffraction order | 1 |
| C2 | 7.3663E−04 |
| C4 | −4.1229E−03 |

The image pickup lens 14 of this example includes the multifocal lens surface on the lens surface of the first lens 8 facing the object side. It should be noted, however, that the image pickup lens 14 is not necessarily limited to such a configuration. The same effects can be achieved even if the image pickup lens 14 includes the multifocal lens surface on the lens surface of the first lens 8 facing the image plane side or the lens surface of any of the second lens 9 to the fourth lens 11 facing the object side or the image plane side. Further, the image pickup lens 14 may include the multifocal lens surfaces on two or more of the lens surfaces.

Further, the image pickup lens 14 of this example includes the diffractive optical element surface on the lens surface of the first lens 8 facing the image plane side. It should be noted, however, that the image pickup lens 14 is not necessarily limited to such a configuration. The same effect can be achieved even if the image pickup lens 14 includes the diffractive optical element surface on the lens surface of the first lens 8 facing the object side or the lens surface of any of the second lens 9 to the fourth lens 11 facing the object side or the image plane side. Further, the image pickup lens 14 may also include the diffractive optical element surface on a lens surface that is a multifocal lens surface. Further, the image pickup lens 14 also may include the diffractive optical element surfaces on two or more of the lens surfaces. Moreover, in terms of correcting chromatic aberration, it is preferable that the image pickup lens 14 includes the diffractive optical element surface on a lens surface relatively close to the aperture stop.

Further, Table 8 below provides the F number Fno of the image pickup lens 14, the focal distance f (mm) of the image pickup lens 14 as a whole resulting from an area constituting the apex of the multifocal lens surface, the overall optical length TL (mm) measured not in terms of air, the maximum image height Y', the diameter (mm) of the aperture of the aperture stop 12, and the value of each of the conditional expressions (1) and (2) associated with the image pickup lens 14 of this example.

TABLE 8

| | |
|---|---|
| Fno | 2.8 |
| f (mm) | 3.29 |
| TL (mm) | 4.33 |
| Y' (mm) | 2.3 |
| Diameter of aperture stop (mm) | 1.17 |
| Diffractive optical element surface | Yes |
| Conditional Expression (1): D/Ymax | 0 |
| Conditional Expression (2): f1/f2 | 1.023, 1.014, 0.964 |

Figure 7A:
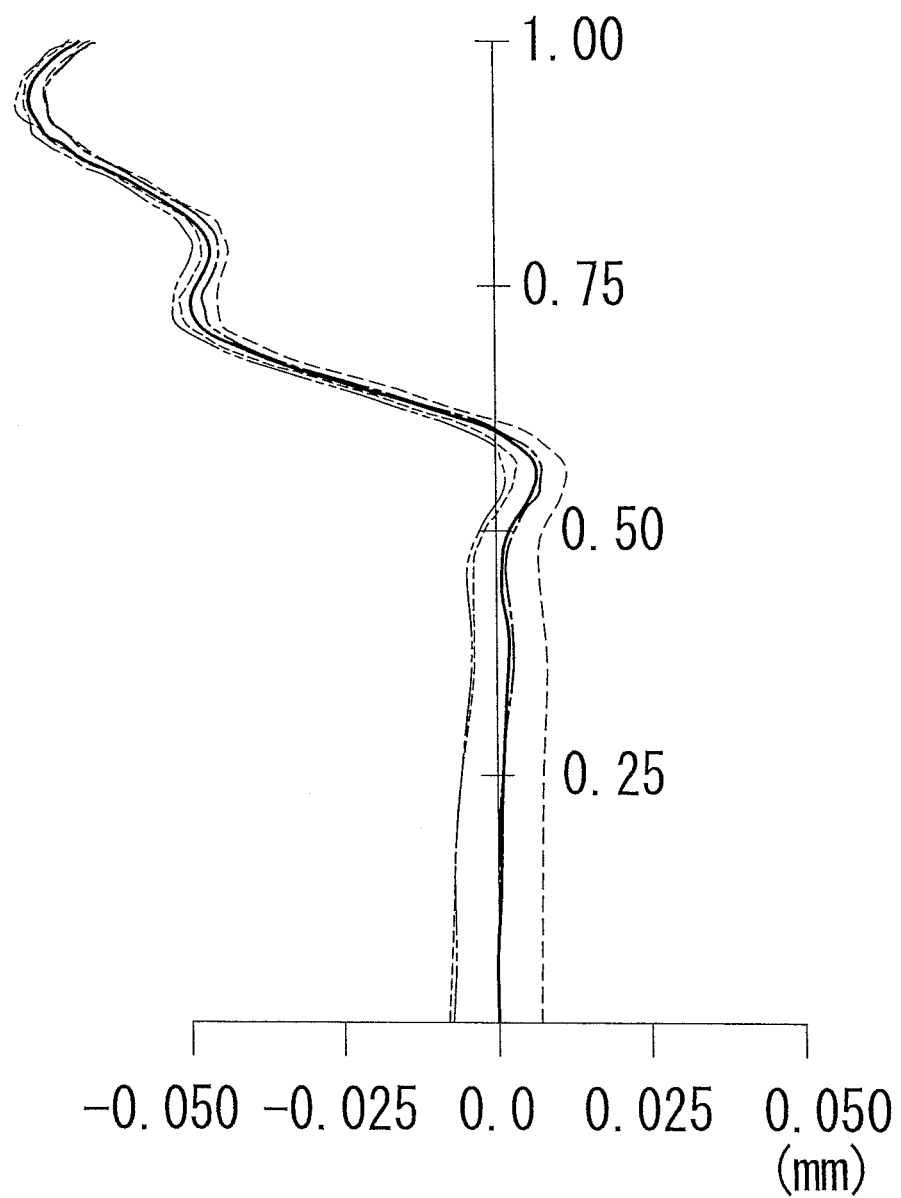
FIG. 7A is a graph showing spherical aberration of the image pickup lens in Example 2 of the present invention.
Figure 7B:
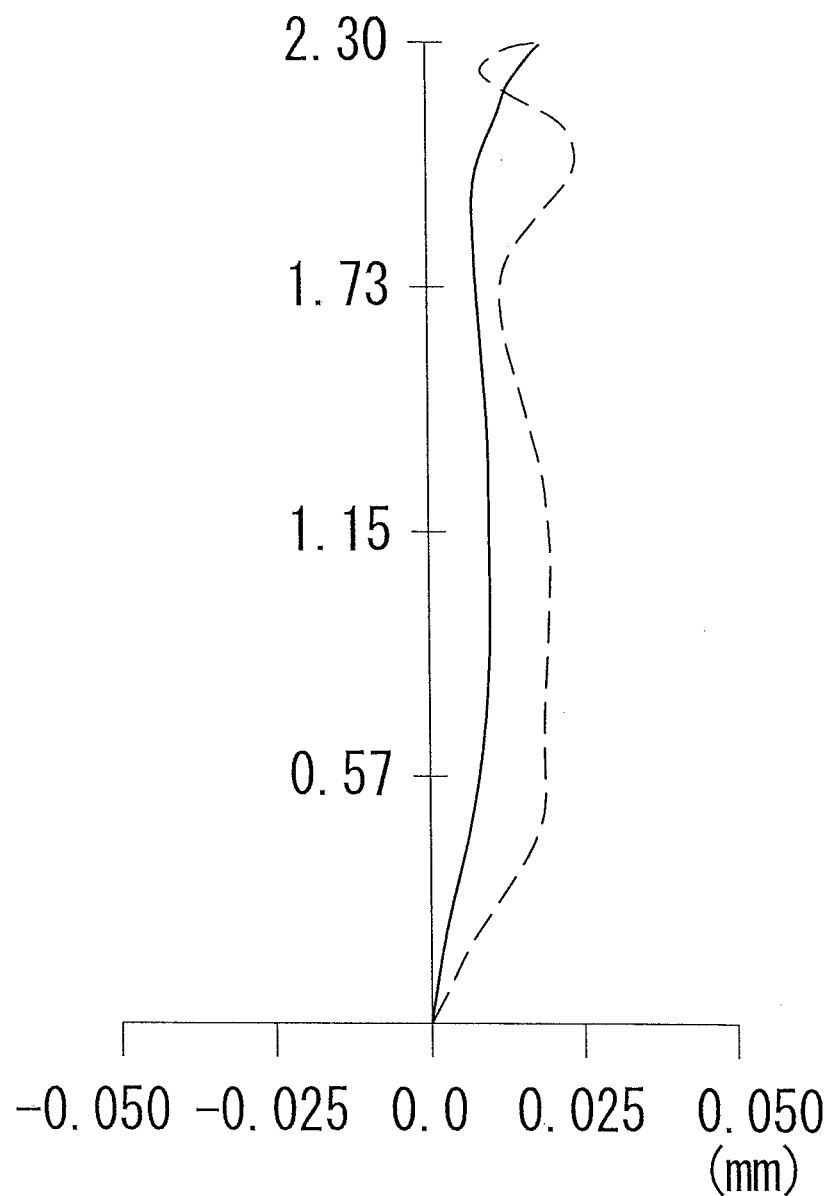
FIG. 7B is a graph showing astigmatism of the image pickup lens in Example 2 of the present invention.
Figure 7C:
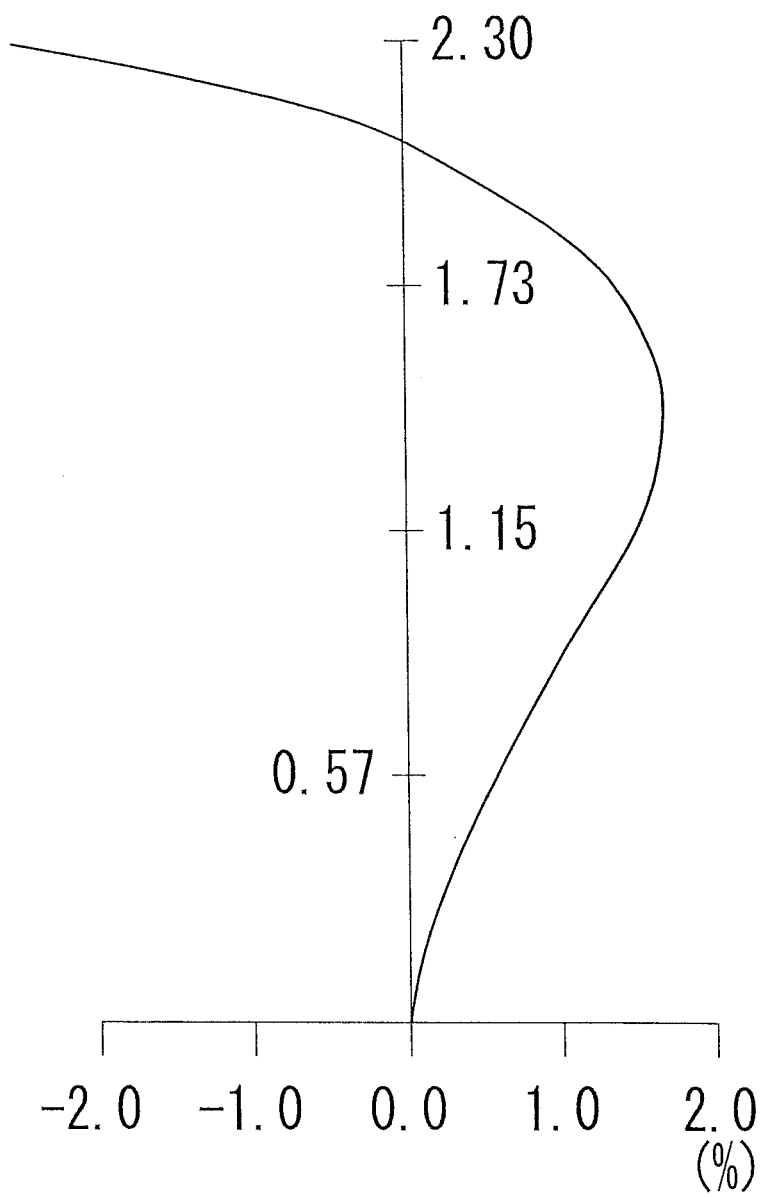
FIG. 7C is a graph showing distortion of the image pickup lens in Example 2 of the present invention.

FIGS. 7A to 7C show graphs of aberrations of the image pickup lens in this example. FIG. 7A is a graph showing spherical aberration. In FIG. 7A, a solid line indicates values at the g line, a long dashed line indicates values at the C line, a short dashed line indicates values at the F line, a double chain line indicates values at the d line, a chain line indicates values at the e line. FIG. 7B is a graph showing astigmatism. In FIG. 7B, a solid line indicates a sagittal field curvature and a dashed line indicates a meridional field curvature. FIG. 7C is a graph showing distortion. Note that longitudinal chromatic aberration can be read from the graph showing spherical aberration in FIG. 7A.

As can been seen from the graphs of aberrations shown in FIGS. 7A to 7C, while the level of spherical aberration is large due to the multifocal lens surface for attaining a large focal depth, chromatic aberration is corrected favorably as a result of having the diffractive optical element surface. Consequently, it is possible to provide an image pickup lens with a large focal depth more suitable for an image restoration system. Further, as is clear from the fact that field curvature and astigmatism are corrected favorably, uniform resolution characteristics can be achieved regardless of the image height. Further, distortion is also corrected favorably.

Figure 8:
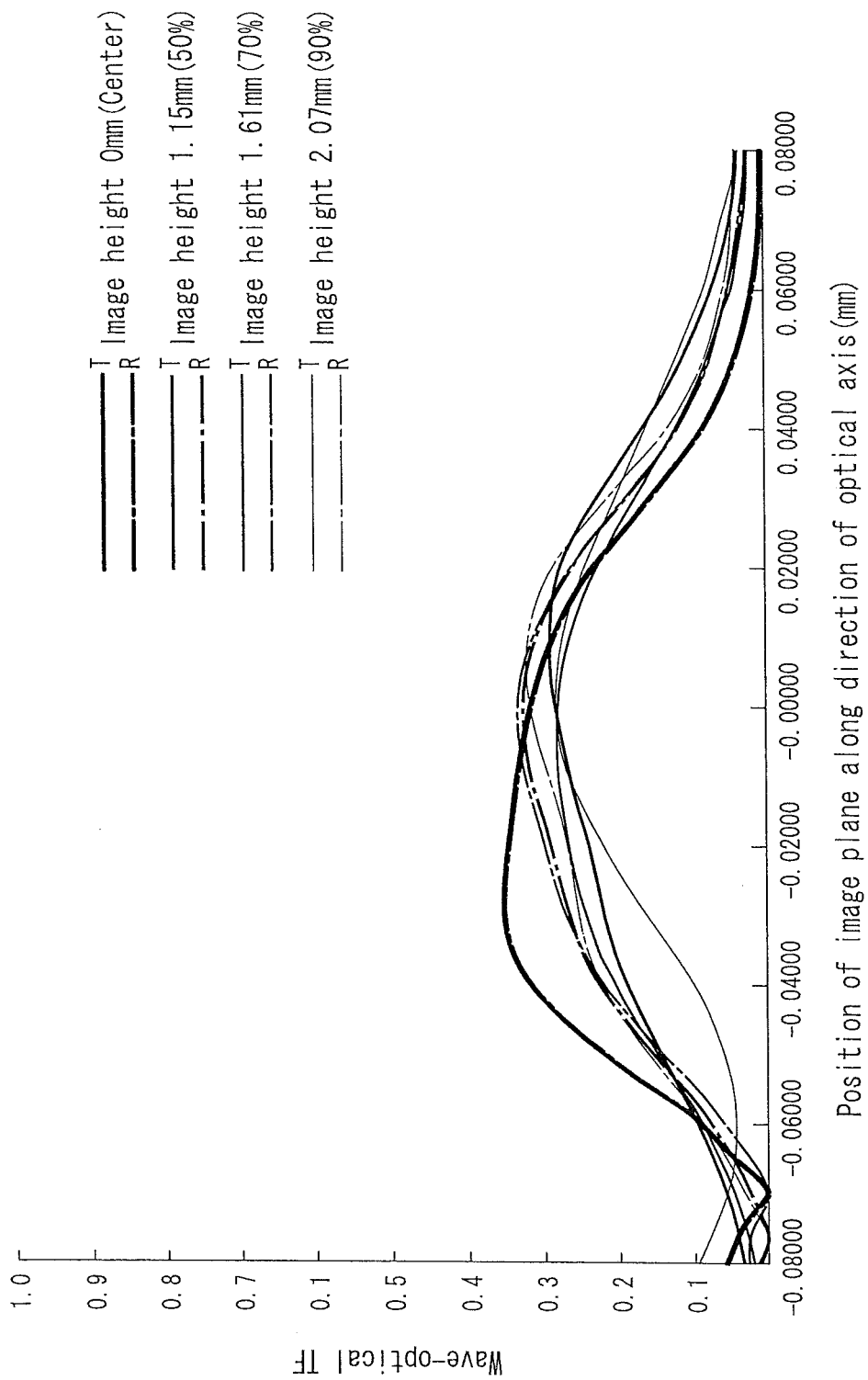
FIG. 8 is a graph showing MTF through-focus characteristics obtained from the image pickup lens in Example 2 of the present invention at an image plane.

FIG. 8 shows MTF through-focus characteristics obtained from the image pickup lens in this example at an image plane. The vertical axis of FIG. 8 represents wave-optical MTF (120 lines/mm) at an object distance of 60 cm and the horizontal axis of FIG. 8 represents the position of the image plane along the direction of the optical axis. FIG. 8 shows the MTF at the center, 50%, 70%, and 90% image heights, where the maximum image height is 2.3 mm.

It should be noted that the MTF shown in FIG. 8 is white-color MTF, and the proportion of the C line (656.2700 nm), the d line (587.5600 nm), the e line (546.0700 nm), the F line (486.1300 nm) and the g line (435.8300 nm) is 5:25:34:22:14. It should be noted that the above effects can be achieved regardless of the proportion of the wavelengths.

A comparison of FIGS. 8 and 4 clearly shows that the image pickup lens of this example has a larger focal depth than that of the typical image pickup lens. Further, it is clear that a large focal depth is ensured in the case of the image pickup lens of this example even at large image heights.

Embodiment 3

Figure 9:
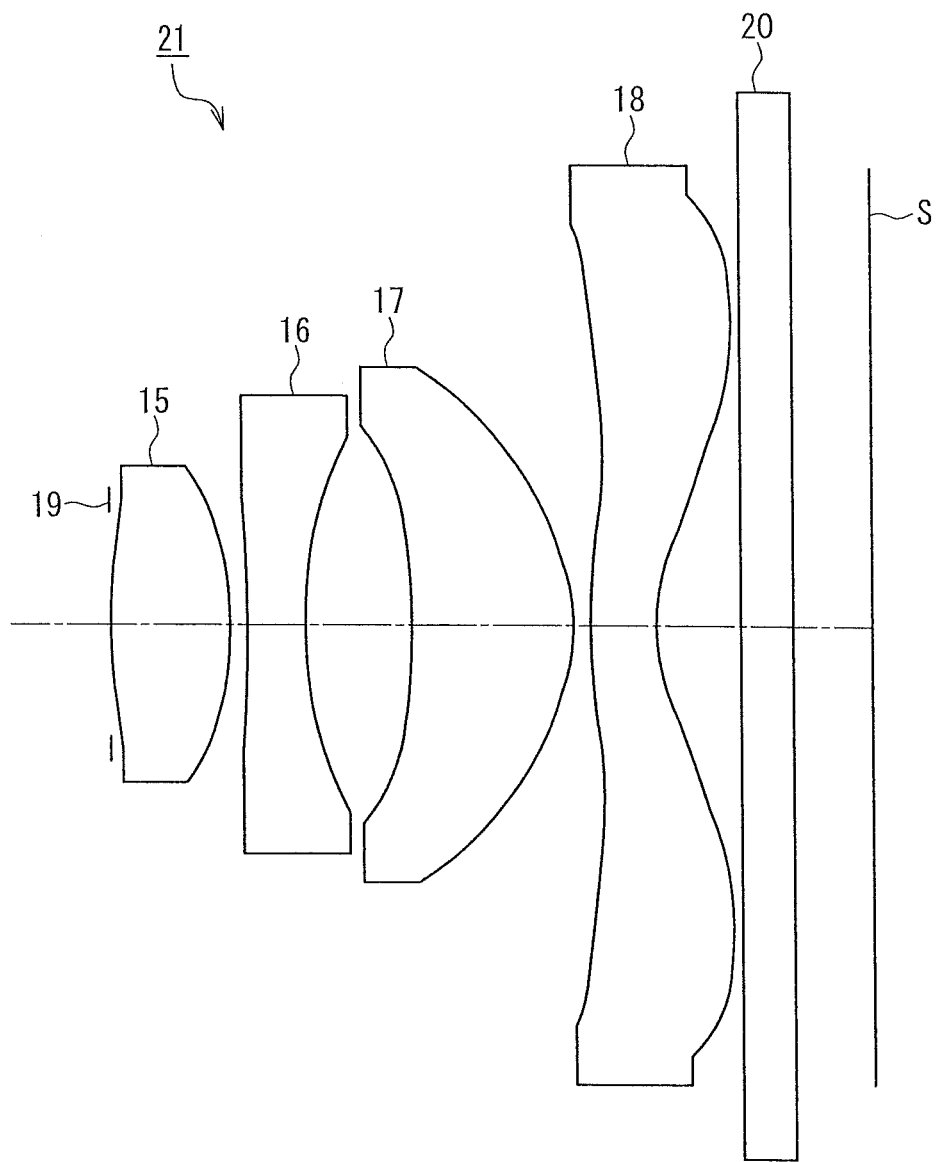
FIG. 9 is a layout diagram showing a configuration of an image pickup lens according to Embodiment 3 of the present invention.

FIG. 9 is a layout diagram showing a configuration of an image pickup lens according to Embodiment 3 of the present invention.

An image pickup lens 21 according to the present embodiment includes at least one lens, and is for use in an image pickup device for restoring images detected by an image sensor. Further, the image pickup lens 21 according to the present embodiment includes, on at least one lens surface of the at least one lens, a multifocal lens surface having a plurality of surface areas having different focal points, and an aperture stop is placed adjacent to the multifocal lens surface. And also in the image pickup lens 21 according to the present embodiment, the conditional expression (1) is satisfied.

As shown in FIG. 9, the image pickup lens 21 according to the present embodiment includes, for example, in order from the object side (the left side of FIG. 9) to the image plane side (the right side of FIG. 9): an aperture stop 19; a first lens 15 that is a biconvex lens having positive power; a second lens 16 that is a biconcave lens having negative power; a third lens 17 that is a meniscus lens having positive power and whose lens surface facing the object side is concave; and a fourth lens 18 that is a meniscus lens having negative power and whose lens surface facing the object side is convex. And the image pickup lens 21 according to the present embodiment includes a multifocal lens surface on the lens surface of the first lens 15 facing the object side (the aperture stop 19 is placed adjacent to the multifocal lens surface).

Here, the aperture stop 19 has a circular aperture.

A transparent parallel plate 20 similar to the parallel plate 6 in Embodiment 1 is disposed between the fourth lens 18 and the image pickup surface S of the image pickup element.

Also in the configuration of the image pickup lens 21 according to the present embodiment, it is desirable that the conditional expression (2) is satisfied.

Further, also in the configuration of the image pickup lens 21 according to the present embodiment, it is desirable that the boundary of the areas is concentric with the optical axis.

Further, also in the configuration of the image pickup lens 21 according to the present embodiment, it is desirable that the image pickup lens 21 includes a diffractive optical element surface on at least one lens surface of the at least one lens. The image pickup lens 21 according to the present embodiment shown in FIG. 9 includes a diffractive optical element surface on the lens surface of the first lens 15 facing the image plane side.

Further, also in the configuration of the image pickup lens 21 according to the present embodiment, it is desirable that MTF through-focus characteristics obtained from the image pickup lens 21 at the image plane describe a curve that has an MTF peak when the image plane is positioned on the positive side of the optical axis direction and declines as the image plane is defocused towards the negative side of the optical axis direction.

Further, also in the configuration of the image pickup lens 21 according to the present embodiment, it is desirable that MTF through-focus characteristics obtained from the image pickup lens 21 at the image plane describe a curve that has an MTF peak when the image plane is positioned on the negative side of the optical axis direction and declines as the image plane is defocused towards the positive side of the optical axis direction.

Example 3

Hereinafter, the image pickup lens according to the present embodiment will be described in more detail by way of a specific example.

Table 9 below provides a specific numerical example of an image pickup lens in this example. Note that the image pickup lens 21 shown in FIG. 9 is configured based on the data provided in Table 9.

TABLE 9

| Surface number | r (mm) | d (mm) | n | ν |
|---|---|---|---|---|
| Aperture stop | ∞ | 0.000 | — | — |
| 1st surface* | See FIG. 10A below | 0.649 | 1.53113 | 55.8 |

TABLE 9-continued

| Surface number | r (mm) | d (mm) | n | ν |
|---|---|---|---|---|
| 2nd surface** | −1.729 | 0.100 | — | — |
| 3rd surface | −13.277 | 0.339 | 1.607 | 27.59 |
| 4th surface | 1.925 | 0.624 | — | — |
| 5th surface | −3.023 | 0.937 | 1.53113 | 55.8 |
| 6th surface | −0.776 | 0.100 | — | — |
| 7th surface | 2.294 | 0.370 | 1.53113 | 55.8 |
| 8th surface | 0.626 | 0.500 | — | — |
| 9th surface | ∞ | 0.300 | 1.5168 | 64.2 |
| 10th surface | ∞ | 0.463 | — | — |
| Image plane | ∞ | — | — | — |

Further, Tables 10A, 10B, and 10C below each provide aspherical coefficients (including conic constants) of the image pickup lens in this example.

TABLE 10A

| | | r (mm) | κ |
|---|---|---|---|
| 1st surface* | Up to 0.4 mm radius | 2.374 | −4.3111E+00 |
| | 0.4 mm radius or more | 2.322 | −4.3111E+00 |
| 2nd surface** | | −1.729 | 1.0835E+00 |
| 3rd surface | | −13.277 | 2.3093E+01 |
| 4th surface | | 1.925 | −3.9223E+00 |
| 5th surface | | −3.023 | −3.5225E−01 |
| 6th surface | | −0.776 | −4.1928E+00 |
| 7th surface | | 2.294 | −8.9819E+00 |
| 8th surface | | 0.626 | −4.0212E+00 |

TABLE 10B

| | | A4 | A6 |
|---|---|---|---|
| 1st surface* | Up to 0.4 mm radius | −5.6088E−02 | −1.4288E−01 |
| | 0.4 mm radius or more | −5.6088E−02 | −1.4288E−01 |
| 2nd surface** | | −6.1379E−02 | −1.0625E−01 |
| 3rd surface | | −9.8563E−02 | 3.9205E−02 |
| 4th surface | | 1.9870E−02 | 1.4825E−02 |
| 5th surface | | −9.5957E−03 | −8.3017E−02 |
| 6th surface | | −1.5859E−01 | 7.1366E−02 |
| 7th surface | | −1.4230E−01 | 4.3445E−02 |
| 8th surface | | −9.0170E−02 | 3.3682E−02 |

TABLE 10C

| | | A8 | A10 | A12 |
|---|---|---|---|---|
| 1st surface* | Up to 0.4 mm radius | −4.2947E−02 | −2.4408E−01 | 0.0000E+00 |
| | 0.4 mm radius or more | −4.2947E−02 | −2.4408E−01 | 0.0000E+00 |
| 2nd surface** | | 2.1048E−01 | −2.5926E−01 | 0.0000E+00 |
| 3rd surface | | 2.2073E−01 | −8.7845E−02 | −5.9226E−02 |
| 4th surface | | 5.0330E−02 | 2.5674E−02 | −3.7795E−02 |
| 5th surface | | −5.7638E−03 | −3.6926E−03 | −2.0970E−02 |
| 6th surface | | −4.5390E−02 | 8.8199E−03 | −1.4437E−03 |
| 7th surface | | −1.1305E−03 | −1.1679E−03 | 1.0325E−04 |
| 8th surface | | −9.4691E−03 | 1.5572E−03 | −1.2181E−04 |

As can be seen from Tables 10A, 10B and 10C, in the image pickup lens 21 of this example, the lens surfaces of the first lens 15 to the fourth lens 18 are all aspherical. It should be noted, however, that the image pickup lens 21 is not necessarily limited to such a configuration.

Further, in Tables 9, 10A, 10B and 10C, the surface marked with an asterisk (the first surface: the lens surface of the first lens 15 facing the object side) is a multifocal lens surface. The multifocal lens surface is divided into two areas, the boundary of which is a circle having a radius of 0.4 mm and concentric with the optical axis. These two areas have the same conic constant and aspherical coefficient but have different focal distances (radiuses of curvature). Further, in order to prevent the occurrence of flare, these two areas have the same amount of sag at the boundary so as to eliminate a difference in level. It should be noted that, also in this case, it is permissible to have a difference in level as long as the size is about a fraction of the design wavelength to several times larger than the design wavelength, and new effects can be expected from such a level of difference (see Embodiment 4 described later).

Further, in Tables 9, 10A, 10B and 10C, the surface marked with two asterisks (the second surface: the lens surface of the first lens 15 facing the image plane side) is a diffractive optical element surface, and a specific numerical example of the diffractive optical element surface is provided in Table 11 below.

TABLE 11

| Design wavelength | 546.07 nm |
|---|---|
| Diffraction order | 1 |
| C2 | 7.0808E−04 |
| C4 | −2.9812E−03 |

The image pickup lens 21 of this example includes the multifocal lens surface on the lens surface of the first lens 15 facing the object side. It should be noted, however, that the image pickup lens 21 is not necessarily limited to such a configuration. The same effects can be achieved even if the image pickup lens 21 includes the multifocal lens surface on the lens surface of the first lens 15 facing the image plane side or the lens surface of any of the second lens 16 to the fourth lens 18 facing the object side or the image plane side. Further, the image pickup lens 21 may include the multifocal lens surfaces on two or more of the lens surfaces.

Further, the image pickup lens 21 of this example includes the diffractive optical element surface on the lens surface of the first lens 15 facing the image plane side. It should be noted, however, that the image pickup lens 21 is not necessarily limited to such a configuration. The same effect can be achieved even if the image pickup lens 21 includes the diffractive optical element surface on the lens surface of the first lens 15 facing the object side or the lens surface of any of the second lens 16 to the fourth lens 18 facing the object side or the image plane side. Further, the image pickup lens 21 also may include the diffractive optical element surface on a lens surface that is a multifocal lens surface. Further, the image pickup lens 21 may also include the diffractive optical element surfaces on two or more of the lens surfaces. Moreover, in terms of correcting chromatic aberration, it is preferable that the image pickup lens 21 includes the diffractive optical element surface on a lens surface relatively close to the aperture stop.

Further, Table 12 below provides the F number Fno, the focal distance f (mm) of the image pickup lens 21 as a whole resulting from an area constituting the apex of the multifocal lens surface, the overall optical length TL (mm) measured not in terms of air, the maximum image height Y', the diameter (mm) of the aperture of the aperture stop 12, and the value of each of the conditional expressions (1) and (2) associated with the image pickup lens 21 of this example.

TABLE 12

| | |
|---|---|
| Fno | 2.8 |
| f (mm) | 3.28 |
| TL (mm) | 4.3 |
| Y' (mm) | 2.3 |
| Diameter of aperture stop (mm) | 1.16 |
| Diffractive optical element surface | Yes |
| Conditional Expression (1): D/Ymax | 0 |
| Conditional Expression (2): f1/f2 | 1.02 |

Figure 10A:
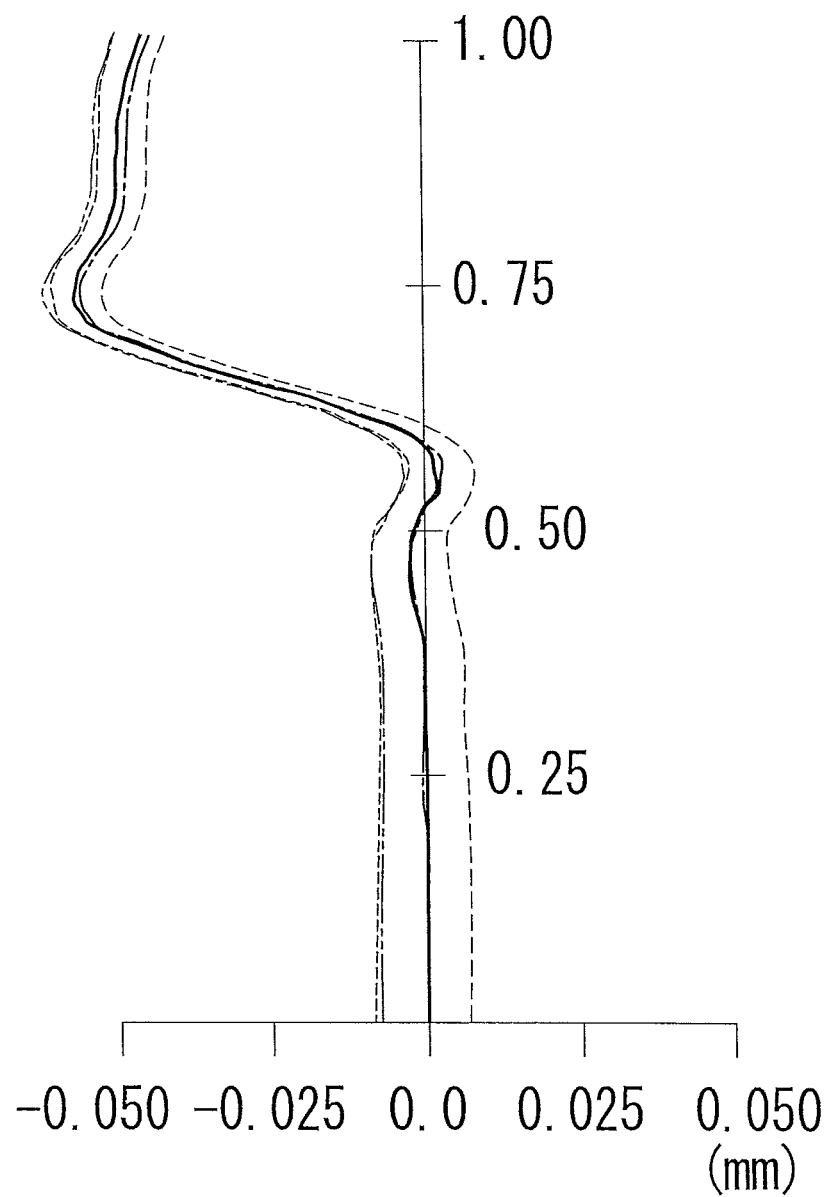
FIG. 10A is a graph showing spherical aberration of the image pickup lens in Example 3 of the present invention.
Figure 10B:
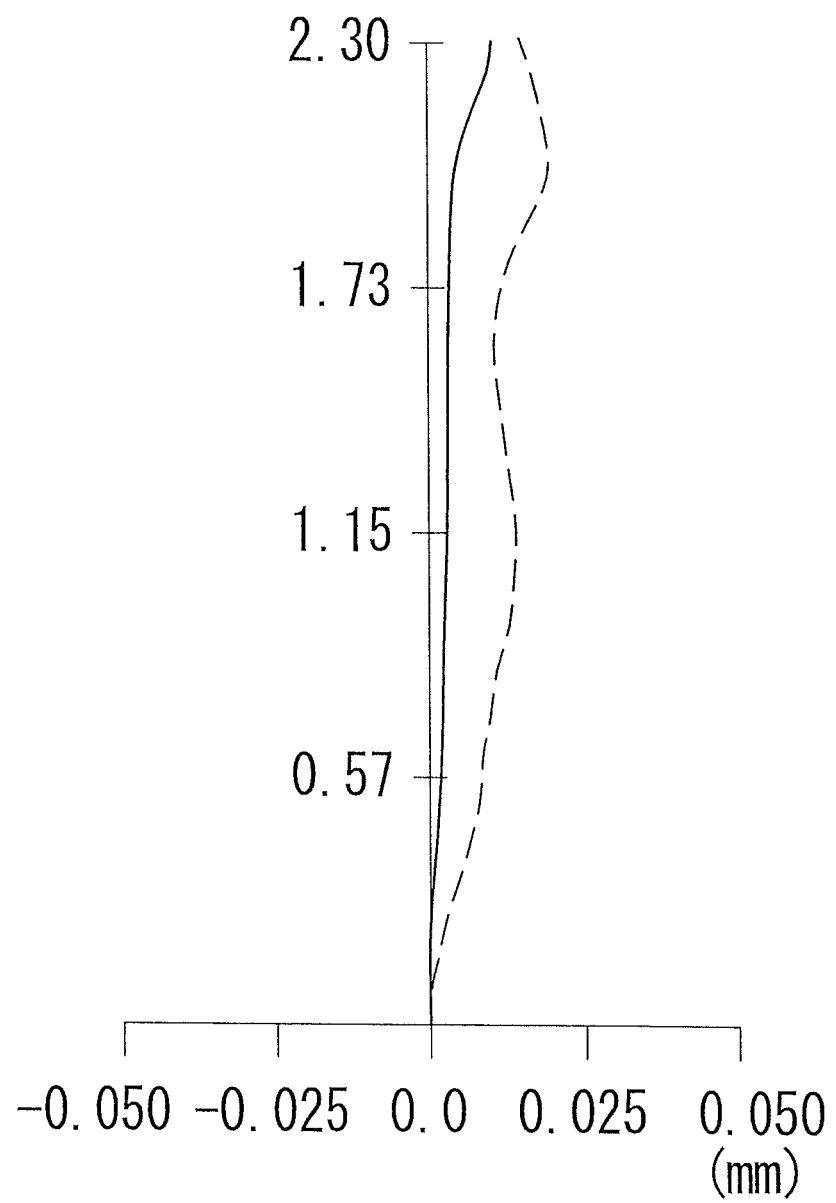
FIG. 10B is a graph showing astigmatism of the image pickup lens in Example 3 of the present invention.
Figure 10C:
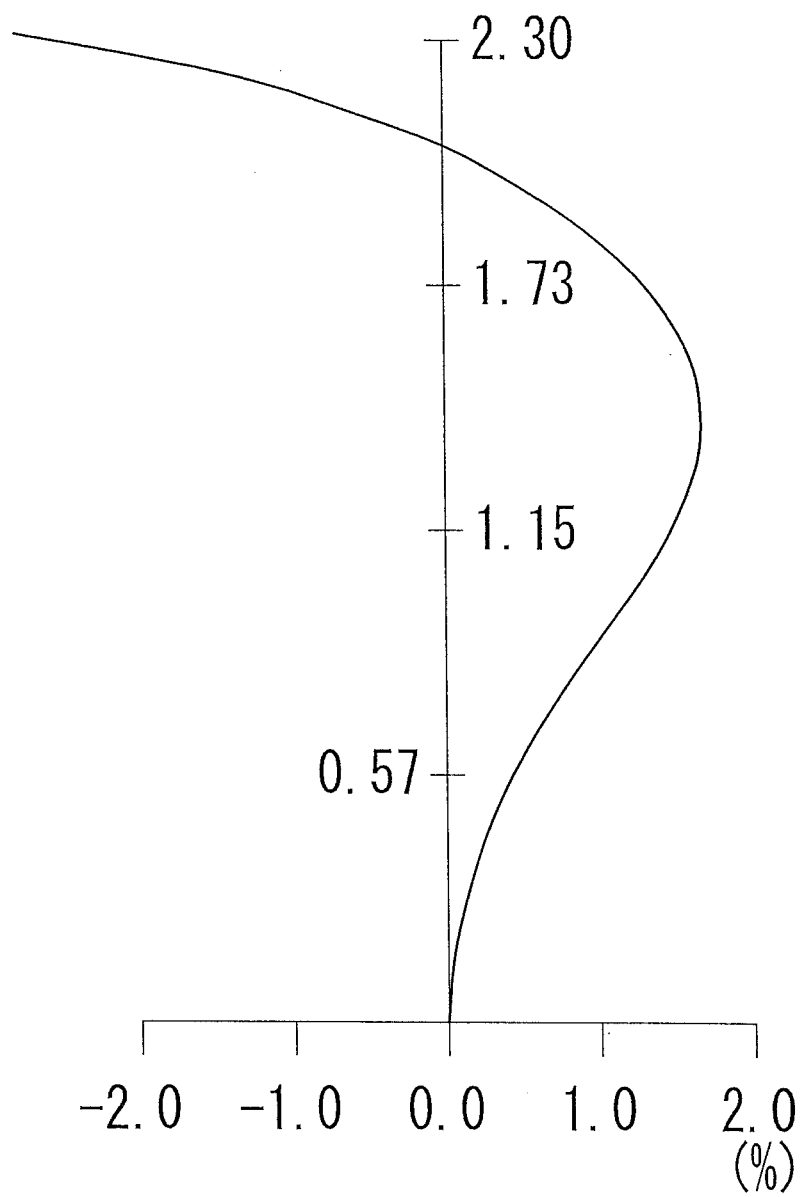
FIG. 10C is a graph showing distortion of the image pickup lens in Example 3 of the present invention.

FIGS. 10A to 10C show graphs of aberrations of the image pickup lens in this example. FIG. 10A is a graph showing spherical aberration. In FIG. 10A, a solid line indicates values at the g line, a long dashed line indicates values at the C line, a short dashed line indicates values at the F line, a double chain line indicates values at the d line, and a chain line indicates values at the e line. FIG. 10B is a graph showing astigmatism. In FIG. 10B, a solid line indicates a sagittal field curvature and a dashed line indicates a meridional field curvature. FIG. 10C is a graph showing distortion. Note that longitudinal chromatic aberration can be read from the graph showing spherical aberration in FIG. 10A.

As can been seen from the graphs of aberrations shown in FIGS. 10A to 10C, while the level of spherical aberration is large due to the multifocal lens surface for attaining a large focal depth, chromatic aberration is corrected favorably as a result of having the diffractive optical element surface. Consequently, it is possible to provide an image pickup lens with a large focal depth more suitable for an image restoration system. Further, as is clear from the fact that field curvature and astigmatism are corrected favorably, uniform resolution characteristics can be achieved regardless of the image height. Further, distortion is also corrected favorably.

Figure 11:
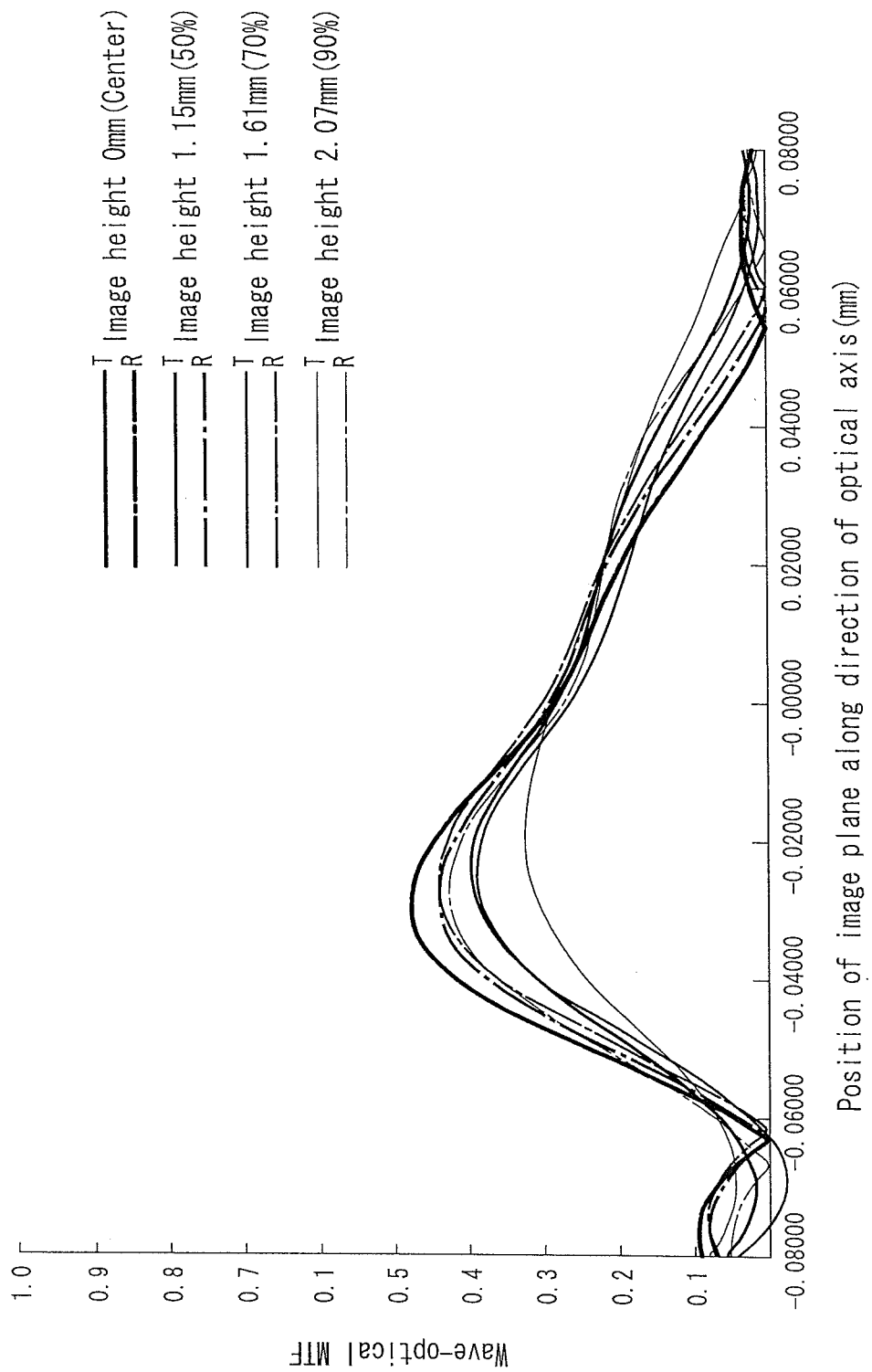
FIG. 11 is a graph showing MTF through-focus characteristics obtained from the image pickup lens in Example 3 of the present invention at an image plane.

FIG. 11 shows MTF through-focus characteristics obtained from the image pickup lens in this example at an image plane. The vertical axis of FIG. 11 represents wave-optical MTF (120 lines/mm) at an object distance of 60 cm and the horizontal axis of FIG. 11 represents the position of the image plane along the direction of the optical axis. FIG. 11 shows the MTF at the center, 50%, 70%, and 90% image heights, where the maximum image height is 2.3 mm.

As shown in FIG. 11, MTF through-focus characteristics obtained from the image pickup lens of this example at the image plane describe a curve that has an MTF peak when the image plane is positioned on the negative side of the optical axis direction and declines as the image plane is defocused towards the positive side of the optical axis direction. This can give the resolution on the near point side an edge over that on the far point side as needed.

It should be noted that the MTF shown in FIG. 11 is white-color MTF, and the proportion of the C line (656.2700 nm), the d line (587.5600 nm), the e line (546.0700 nm), the F line (486.1300 nm) and the g line (435.8300 nm) is 5:25:34:22:14. It should be noted that the above effects can be achieved regardless of the proportion of the wavelengths.

A comparison of FIGS. 11 and 4 clearly shows that the image pickup lens of this example has a larger focal depth than that of the typical image pickup lens. Further, it is clear that a large focal depth is ensured in the case of the image pickup lens of this example even at large image heights.

Here, through-focus MTF at an object distance of 60 cm is shown. At an infinite object distance and a near object distance, through-focus MTF describes a curve roughly similar to that described by through-focus MTF at an object distance of 60 cm but the curve shifts along the direction of the optical axis. More specifically, through-focus MTF at an infinite object distance describes a curve roughly similar to that described by through-focus MTF at an object distance of 60 cm but the curve shifts towards the image pickup lens. On the other hand, through-focus MTF at a near object distance describes a curve roughly similar to that described by through-focus MTF at an object distance of 60 cm but the curve shifts towards the opposite side to the image pickup lens. With this in mind, given that an image plane is fixed to, for example, the origin point of the horizontal axis of FIG. 11, MTF at this image plane increases at a near object distance and declines gradually as the object distance increases in this example. And this is effective for a demand that a higher resolution is required on the near point side depending on the purposes. In contrast, when a higher resolution is required on the far point side, the optical design may be performed in view of such a demand.

Embodiment 4

Figure 12:
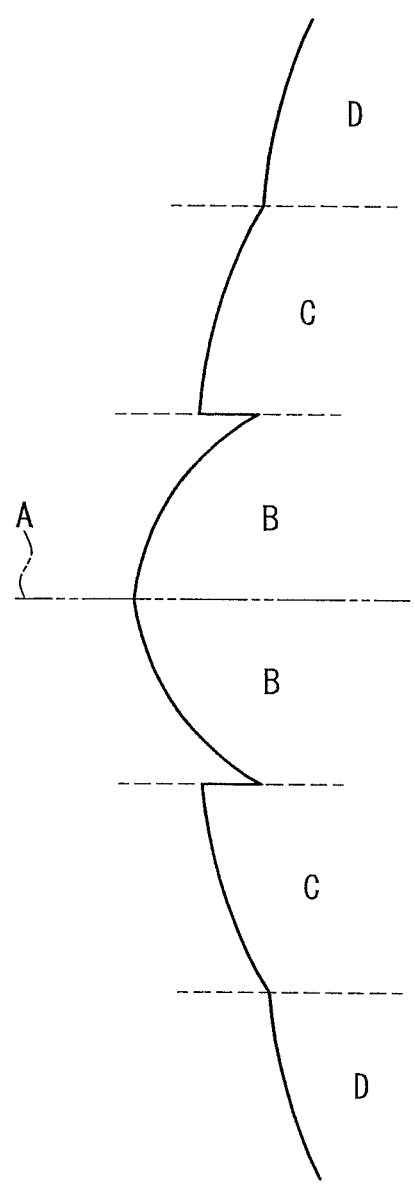
FIG. 12 is a cross-sectional view schematically showing multifocal lens surfaces of an image pickup lens according to Embodiment 4 of the present invention.
Figure 12:
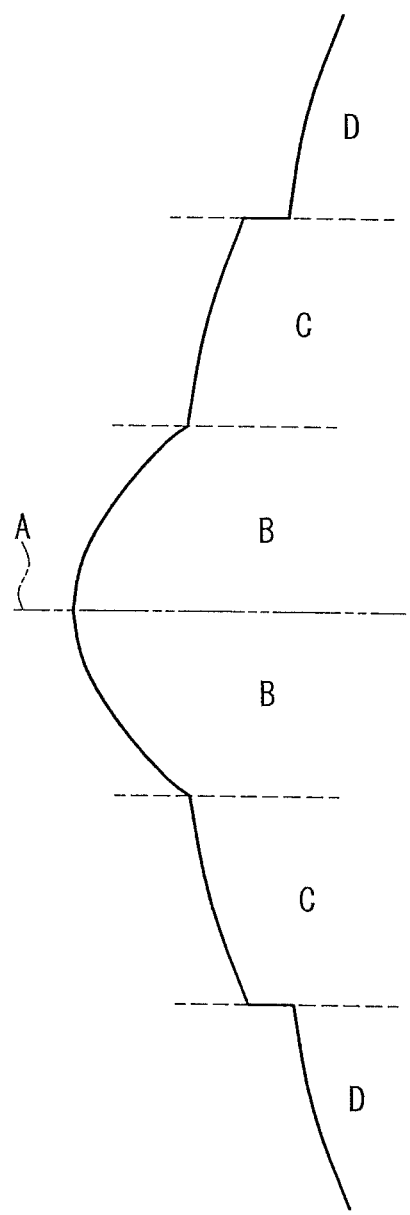

Each of FIGS. 12(*a*) and 12(*b*) is a cross-sectional view schematically showing a multifocal lens surface of an image pickup lens according to Embodiment 4 of the present invention.

As in the case of the image pickup lens 7 according to Embodiment 1, the image pickup lens 14 according to Embodiment 2, and the image pickup lens 21 according to Embodiment 3, the image pickup lens according to the present embodiment has a large focal depth from the center to the outer part of an image plane formed on an image sensor because the areas of its multifocal lens surface vary from each other in surface definition such as the radius of curvature, conic constant, and aspherical coefficient. Further, as shown in FIGS. 12(*a*) and 12(*b*), in the image pickup lens of the present embodiment, one of any two of the areas of the multifocal lens surface is shifted relative to the other of the any two of the areas along the direction of the optical axis so that light rays that respectively pass through the any two of the areas have a certain phase difference. In this case, the shift amount is about a fraction of the design wavelength to several times larger than the design wavelength.

The multifocal lens surfaces of the image pickup lens shown in FIGS. 12(*a*) and 12(*b*) are each divided into three areas B, C, and D having different curvature by two circles concentric with the optical axis A. In the multifocal lens surface shown in FIG. 12(*a*), the central area B is shifted relative to the outer areas C and D along the direction of the optical axis. Further, in the multifocal lens surface shown in FIG. 12(*b*), the outermost area D is shifted relative to the inner areas B and C along the direction of the optical axis.

In this way, if one of any two of the areas of the multifocal lens surface is shifted relative to the other of the any two of the areas along the direction of the optical axis so that light rays that respectively pass through the any two of the areas have a certain phase difference, it is possible to control the image pickup lens more easily to have a large focal depth from the center to the outer part of an image plane formed on an image sensor (an increase in the focal depth can be controlled more easily).

More specifically, it is desirable that d satisfies the following conditional expression (4), where d is the shift amount.

$$0.04\ \mu m \leq |d| \leq 3.25\ \mu m \quad (4)$$

If |d| becomes smaller than the lower limit of the conditional expression (4), a phase difference to be developed would be too small, so that the effect of increasing the focal depth may not be attained adequately. On the other hand, if |d| becomes larger than the upper limit of the conditional expression (4), a large difference in level is produced between the adjacent areas. And light rays incident to the difference portion cause flare and may affect the image quality.

More preferably, it is desirable that the following conditional expression (5) is satisfied.

$$0.07\ \mu m \leq |d| \leq 1.5\ \mu m \quad (5)$$

It is particularly desirable for an image pickup lens using visible light, principally for an image pickup lens consisting of plastic lenses to satisfy the conditional expression (5).

Embodiment 5

Figure 13:
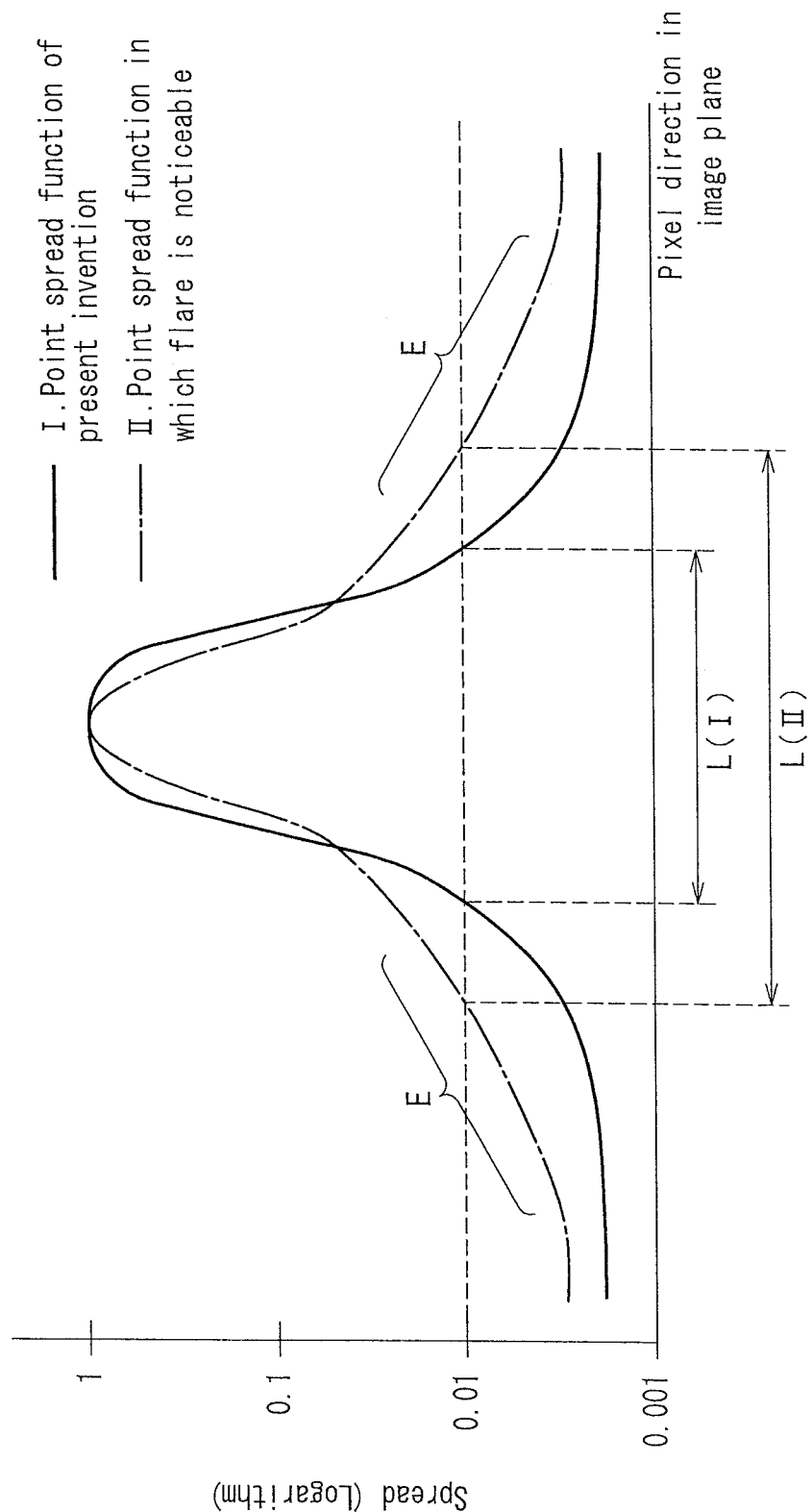
FIG. 13 is a graph showing a point spread function obtained from an image pickup lens according to Embodiment 5 of the present invention at a given image point.

FIG. 13 is a graph showing a point spread function obtained from an image pickup lens according to Embodiment 5 of the present invention at a given image point.

As in the case of Embodiments 1 to 4, when an image pickup lens with a large focal depth from the center to the outer part of an image plane formed on an image sensor is used to shoot a subject with a high level of brightness, flare may occur due to a point becoming out of focus. This is because a point spread function (PSF) obtained from this image pickup lens at a given image point (where the maximum value of the point spread function is 1) has large skirt portions in which the spread becomes about 0.01. The portions E in FIG. 13 are the skirt portions that become a cause of flare. The point spread function II (chain line) in which flare is noticeable has considerably large skirt portions. Further, even if the image restoration system described above is a system that restores images based on the predetermined point spread function of the image pickup lens, the images taken limit its processable pixel range. Further, if a point is sharpened to reduce the spread in the skirt portions, the effect of increasing the focal depth cannot be attained adequately.

For these reasons, in the present embodiment, when a maximum value of a point spread function obtained from the image pickup lens at a given image point is 1, and L is a width of the point spread function in which the spread becomes 0.01 or more, L and P satisfies the following conditional expression (3) (see the point spread function I in FIG. 13 (solid line)).

$$4 \leq L/P \leq 20 \quad (3)$$

Where P is a pixel pitch of the image sensor.

By having such image characteristics that the skirt portions of the point spread function are within the above range, it is possible to control the image pickup lens to have large a focal depth from the center to the outer part of an image plane formed on the image sensor and to suppress the occurrence of flare when shooting a subject with a high level of brightness.

Embodiment 6

Figure 14:
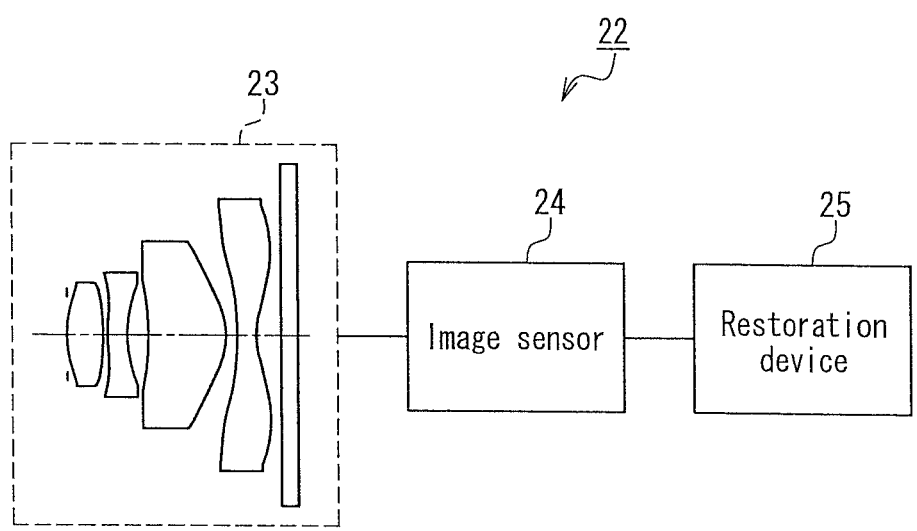
FIG. 14 is a schematic view showing a configuration of an image pickup device according to Embodiment 6 of the present invention.

Next, an image pickup device using the image pickup lens of the present invention will be described with reference to FIG. 14. FIG. 14 is a schematic view showing a configuration of an image pickup device according to Embodiment 6 of the present invention.

As shown in FIG. 14, the image pickup device 22 according to the present embodiment includes an image pickup lens 23, an image sensor 24 for detecting an image formed by the image pickup lens 23, and a restoration device 25 for restoring an image detected by the image sensor 24. Here, the image pickup lens of the present invention, for example, any of the image pickup lenses 7, 14 and 21 described in Embodiments 1 to 3, is used as the image pickup lens 23. Further, as the image sensor 24, for example, any of CCD and CMOS image sensors having a pixel pitch of 1.75 μm and a pixel count of 5 mega pixels to CCD and CMOS image sensors having a pixel pitch of 1.4 μm and a pixel count of 8 mega pixels can be used.

According to the configuration of the image pickup device 22 of the present embodiment, the image pickup lens of the present invention is used as the image pickup lens 23. Thus, it is possible to provide a compact and high-resolution performance image pickup device.

Embodiment 7

Figure 15:
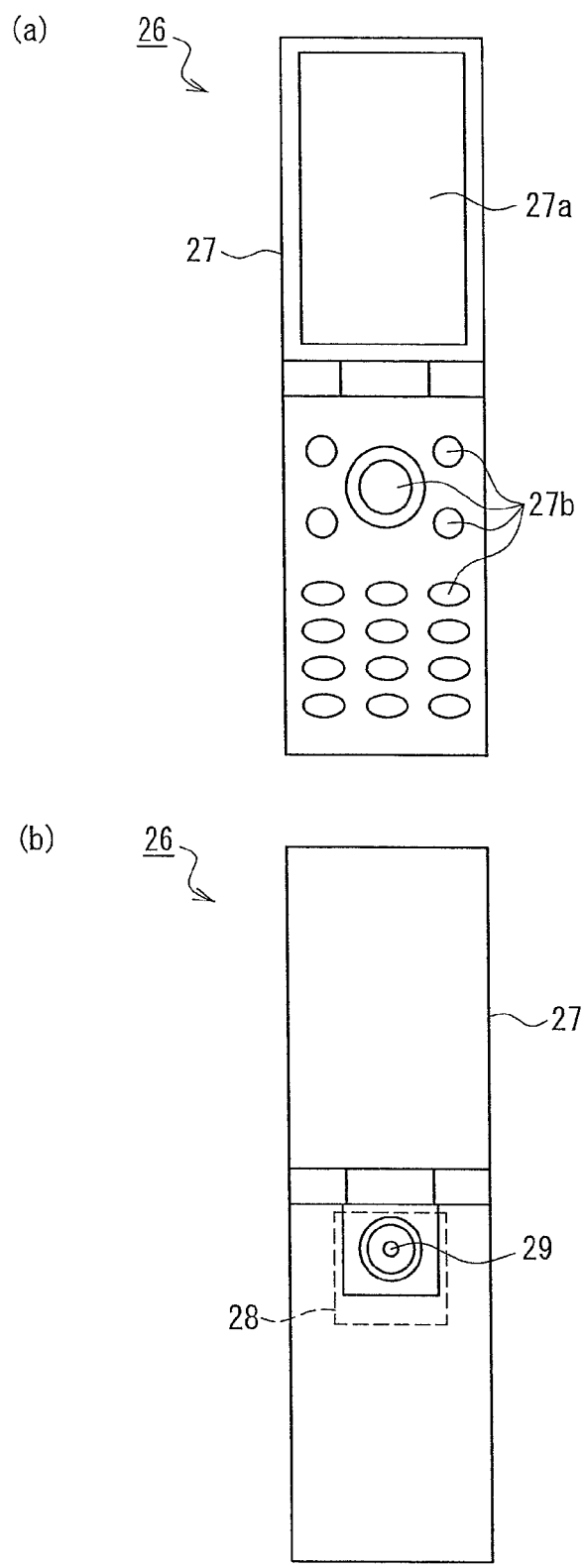
FIG. 15(*a*) is a plan view and 15(*b*) is a rear view showing a configuration of a mobile phone as a portable apparatus according to Embodiment 7 of the present invention.

Next, a portable apparatus equipped with the image pickup device of the present invention will be described with reference to FIG. 15. FIG. 15($a$) is a plan view and FIG. 15($b$) is a rear view showing a configuration of a mobile phone as a portable apparatus according to Embodiment 7 of the present invention.

As shown in FIG. 15, the portable apparatus 26 according to the present embodiment is a mobile phone equipped with a camera, and includes a case 27, a display 27a and operating portions 27b provided on the case 27, and an image pickup device 28 incorporated in the case 27.

As the image pickup device 28, the image pickup device of the present invention, for example, the image pickup device 22 described in Embodiment 6 is used. In FIG. 15($b$), the reference numeral 29 denotes a first lens of an image pickup lens of the image pickup device 28.

According to the configuration of the portable apparatus 26 of the present embodiment, the image pickup device of the present invention is used as the image pickup device 28. Thus, it is possible to provide a compact and high-performance portable apparatus such as a mobile phone.

INDUSTRIAL APPLICABILITY

Since the image pickup lens of the present invention has large depth from the center to the outer part of an image plane formed on the image sensor and is capable of maintaining its focal depth within a practical range and thus suppressing a decline in the resolution, it is particularly useful in the field of small portable apparatuses equipped with an image pickup device, such as mobile phones, that are desired to be compact and have high resolution performance.

DESCRIPTION OF REFERENCE NUMERALS 1, 8, 15, 29 first lens
2, 9, 16 second lens
3, 10, 17 third lens
4, 11, 18 fourth lens
5, 12, 19 aperture stop
6, 13, 20 parallel plate
7, 14, 21, 23 image pickup lens
22, 28 image pickup device
24 image sensor
25 restoration device
26 portable apparatus
27 case
S image pickup surface

The invention claimed is:

1. An image pickup lens for use in an image pickup device for restoring an image detected by an image sensor, wherein the image pickup lens comprises at least one lens, the image pickup lens includes, on at least one lens surface of the at least one lens, a multifocal lens surface having a plurality of surface areas having different focal points, an aperture stop is placed adjacent to the multifocal lens surface, and one of any two of the areas of the multifocal lens surface is shifted relative to the other of the any two of the areas along the direction of the optical axis so that light rays that respectively pass through the any two of the areas have a certain phase difference, wherein D and Ymax satisfy the following conditional expression (1):

$$0 \le D/Y\max \le 0.1 \quad (1)$$

where D is an absolute value of a distance between the multifocal lens surface and a surface of the aperture stop on an optical axis, and Ymax is an absolute value of a maximum image height on an image plane to be formed on the image sensor.

2. The image pickup lens according to claim 1, wherein f1 and f2 satisfy the following conditional expression (2):

$$0.95 \le f1/f2 \le 1.05 \quad (2)$$

where f1 and f2 are focal distances of any two of the areas of the multifocal lens surface.

3. The image pickup lens according to claim 1, wherein a boundary of the areas is concentric with the optical axis.

4. The image pickup lens according to claim 1, wherein the image pickup lens includes a diffractive optical element surface on at least one lens surface of the at least one lens.

5. The image pickup lens according to claim 1, wherein Modulation Transfer Function (MTF) through-focus characteristics obtained from the image pickup lens at the image plane describe a curve that has an MTF peak when the image plane is positioned on a positive side of an optical axis direction and declines as the image plane is defocused towards a negative side of the optical axis direction, wherein the MTF through-focus characteristics include MTF characteristics defined by a horizontal axis and a vertical axis, the horizontal axis representing a direction of the optical axis in an image field of the image pickup lens wherein a direction from an object field to an image field is a positive direction, and the vertical axis represents an image plane that is perpendicular to the optical axis.

6. The image pickup lens according to claim 1, wherein Modulation Transfer Function (MTF) through-focus characteristics obtained from the image pickup lens at the image plane describe a curve that has an MTF peak when the image plane is positioned on a negative side of an optical axis direction and declines as the image plane is defocused towards a positive side of the optical axis direction, wherein the MTF through-focus characteristics include MTF characteristics defined by a horizontal axis and a vertical axis, the horizontal axis representing a direction of the optical axis in an image field of the image pickup lens wherein a direction from an object field to an image field is a positive direction, and the vertical axis represents an image plane that is perpendicular to the optical axis.

7. The image pickup lens according to claim 1, wherein when a maximum value of a point spread function obtained from the image pickup lens at a given image point is 1, L and P satisfy the following conditional expression (3):

$$4 \le L/P \le 20 \quad (3)$$

where L is a width of the point spread function in which the spread becomes 0.01 or more, and P is a pixel pitch of the image sensor.

8. An image pickup device comprising an image pickup lens, an image sensor for detecting an image formed by the image pickup lens, and a restoration device for restoring an image detected by the image sensor, wherein the image pickup device uses, as the image pickup lens, the image pickup lens according to claim 1.

9. A portable apparatus equipped with the image pickup device according to claim 8.

* * * * *